US012634788B2

(12) United States Patent
Choi et al.

(10) Patent No.: US 12,634,788 B2
(45) Date of Patent: May 19, 2026

(54) ELECTRONIC DEVICE CAPABLE OF CONTROLLING FREQUENCY BANDS FOR WIRELESS COMMUNICATION AND OPERATION METHOD THEREOF

(71) Applicant: SAMSUNG ELECTRONICS CO., LTD., Suwon-si (KR)

(72) Inventors: Seongsu Choi, Suwon-si (KR); Yeji Yoon, Suwon-si (KR); Hyunkee Min, Suwon-si (KR); Taeyong Kim, Suwon-si (KR); Sunkee Lee, Suwon-si (KR); Junhak Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 488 days.

(21) Appl. No.: 18/115,451

(22) Filed: Feb. 28, 2023

(65) Prior Publication Data

US 2023/0217331 A1 Jul. 6, 2023

Related U.S. Application Data

(63) Continuation of application No. PCT/KR2022/021467, filed on Dec. 28, 2022.

(30) Foreign Application Priority Data

Dec. 30, 2021 (KR) ........................ 10-2021-0193183

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0061* (2013.01); *H04W 36/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,924,438 B1 | 3/2018 | Guo et al. | |
| 10,098,115 B2 | 10/2018 | Hara | |

(Continued)

FOREIGN PATENT DOCUMENTS

| | | |
|---|---|---|
| EP | 3285529 A1 | 2/2018 |
| JP | 2014-17885 A | 1/2014 |

(Continued)

OTHER PUBLICATIONS

Communication dated Mar. 24, 2023, issued by the International Searching Authority in counterpart International Application No. PCT/KR2022/021467 (PCT/ISA/210).

(Continued)

*Primary Examiner* — Kodzovi Acolatse
(74) *Attorney, Agent, or Firm* — Sughrue Mion, PLLC

(57) ABSTRACT

A electronic device includes a memory, a communication circuit that supports plural frequency bands for wireless local area network (WLAN) communication, and a processor operably connected to the memory and the communication circuit. The processor establishes WLAN communication with an access point (AP) over a first frequency band among the frequency bands, compares, based on a signal of a second frequency band different from the first frequency band being detected, the first frequency band with the second frequency band, determines, based on the second frequency band being higher than the first frequency band, a change in a strength of a signal received over the first frequency band, estimates, when the change indicates an increase in the strength, a link quality for the AP over the second frequency band, and switches the first frequency
(Continued)

band for WLAN communication with the AP to the second frequency band based on the link quality.

20 Claims, 10 Drawing Sheets

(51) Int. Cl.
    *H04W 36/06*        (2009.01)
    *H04W 84/12*        (2009.01)

(56)                    References Cited

U.S. PATENT DOCUMENTS

| | | | |
|---|---|---|---|
| 10,264,477 B2 | 4/2019 | Amini et al. | |
| 10,912,088 B2 * | 2/2021 | Katar | H04W 8/02 |
| 11,102,715 B2 | 8/2021 | Gan et al. | |
| 12,323,865 B2 * | 6/2025 | Gan | H04W 88/10 |
| 2006/0223574 A1 | 10/2006 | Chandra | |
| 2010/0074190 A1 | 3/2010 | Cordeiro et al. | |
| 2015/0282032 A1 | 10/2015 | Gupta et al. | |
| 2015/0350993 A1 | 12/2015 | Kasten et al. | |
| 2016/0165475 A1 | 6/2016 | Kim et al. | |
| 2016/0227544 A1 * | 8/2016 | Katar | H04W 48/16 |
| 2018/0176284 A1 * | 6/2018 | Strater | H04W 40/12 |
| 2018/0295624 A1 * | 10/2018 | Katar | H04W 8/02 |
| 2020/0217875 A1 | 7/2020 | Li et al. | |
| 2022/0103317 A1 * | 3/2022 | Park | H04L 27/26132 |
| 2023/0284107 A1 * | 9/2023 | Gan | H04L 41/082 |
| | | | 370/331 |
| 2024/0064836 A1 * | 2/2024 | Shafin | H04W 8/24 |

FOREIGN PATENT DOCUMENTS

| | | | |
|---|---|---|---|
| KR | 10-2014-0029143 A | 3/2014 |
| KR | 10-1488842 B1 | 2/2015 |
| KR | 10-2017-0078967 A | 7/2017 |
| KR | 10-2239919 B1 | 4/2021 |
| WO | 2021/190230 A1 | 9/2021 |

OTHER PUBLICATIONS

"IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications," IEEE Standard Association, IEEE Computer Society, IEEE Std 802.11™-2020, Dec. 2020, Total 149 pages.

"IEEE P802.11ax™M/D8.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," LAN/MAN Standards Committee of the IEEE Computer Society, IEEE P802.11ax™M/D8.0, Oct. 2020, Total 820 pages.

* cited by examiner

FIG. 4

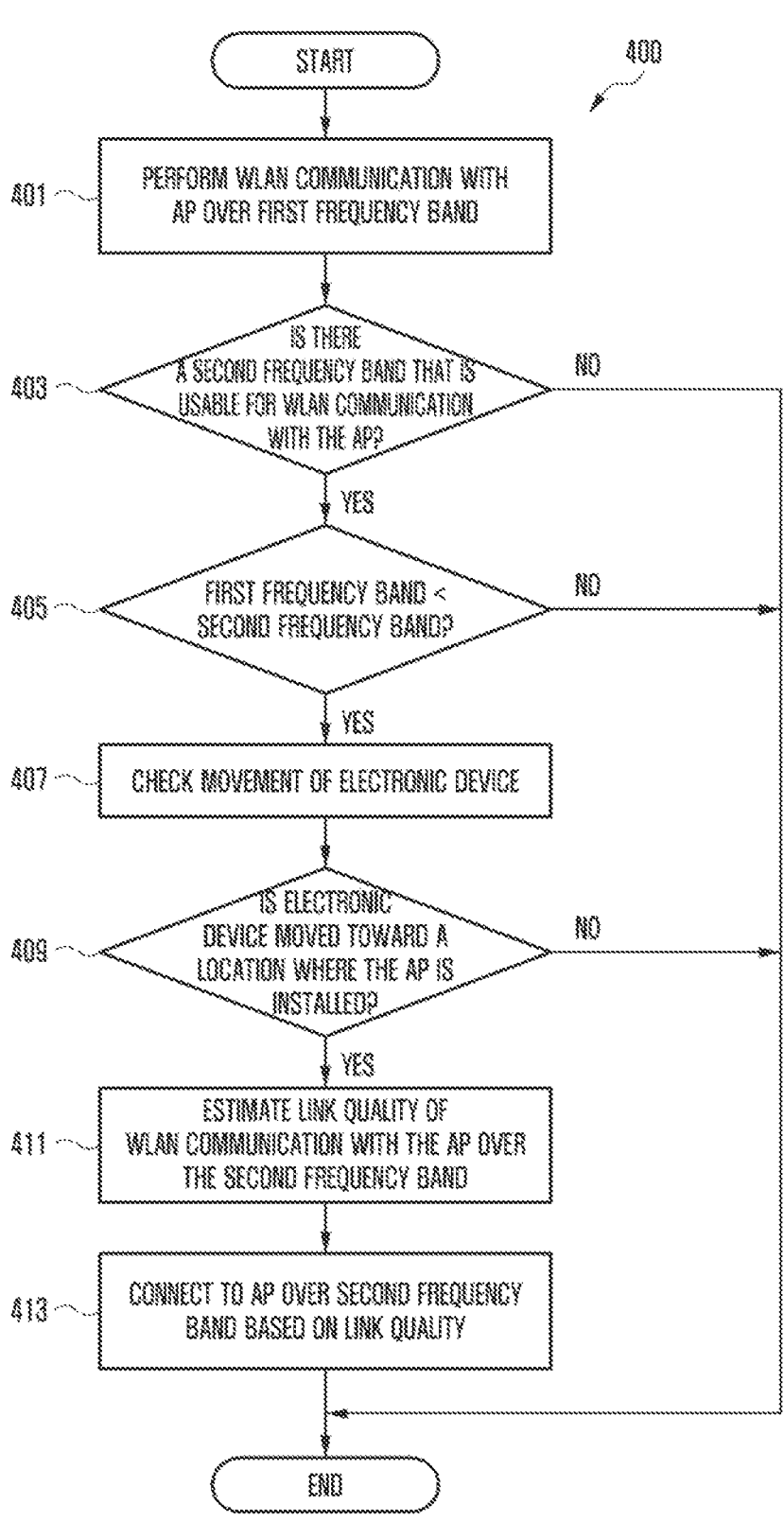

400

START

401 — PERFORM WLAN COMMUNICATION WITH AP OVER FIRST FREQUENCY BAND

403 — IS THERE A SECOND FREQUENCY BAND THAT IS USABLE FOR WLAN COMMUNICATION WITH THE AP?    NO

YES

405 — FIRST FREQUENCY BAND < SECOND FREQUENCY BAND?    NO

YES

407 — CHECK MOVEMENT OF ELECTRONIC DEVICE

409 — IS ELECTRONIC DEVICE MOVED TOWARD A LOCATION WHERE THE AP IS INSTALLED?    NO

YES

411 — ESTIMATE LINK QUALITY OF WLAN COMMUNICATION WITH THE AP OVER THE SECOND FREQUENCY BAND

413 — CONNECT TO AP OVER SECOND FREQUENCY BAND BASED ON LINK QUALITY

END

START

500

501 — CONNECT TO AP OVER FIRST FREQUENCY BAND

503 — IS THERE ANOTHER FREQUENCY BAND SUPPORTED BY AP?    NO

YES

505 — PERFORM SCAN

507 — IS SIGNAL OF SECOND FREQUENCY BAND SUPPORTED BY THE AP DETECTED BASED ON SCAN?    NO

YES

509 — COMPARE FIRST FREQUENCY BAND AND SECOND FREQUENCY BAND

END

ELECTRONIC DEVICE CAPABLE OF CONTROLLING FREQUENCY BANDS FOR WIRELESS COMMUNICATION AND OPERATION METHOD THEREOF

CROSS-REFERENCE TO RELATED APPLICATIONS

This application is a continuation application of International Application No. PCT/KR2022/021467, filed on Dec. 28, 2022, in the World Intellectual Property Office (WIPO), which is based on and claims priority to Korean Patent Application No. 10-2021-0193183, filed on Dec. 30, 2021, the disclosures of each of which being incorporated by reference herein in their entireties.

BACKGROUND

1. Field

The disclosure relates to an apparatus and method for controlling frequency bands for wireless communication in an electronic device of a wireless local area network (WLAN) system.

2. Description of Related Art

A wireless local area network (WLAN) system may support radio connection of various electronic devices such as a smartphone, a tablet personal computer (PC), and a notebook by using a specified frequency band (e.g., about 2.4 GHz band, about 5 GHz band, and/or about 6 GHz band).

WLAN systems may be installed in public spaces such as airports, train stations, offices, or department stores as well as private spaces such as homes.

SUMMARY

In accordance with an aspect of the disclosure, an electronic device may comprise a memory, a communication circuit configured to support a plurality of frequency bands for wireless local area network (WLAN) communication, and a processor operably connected to the memory and the communication circuit. The processor may be configured to establish WLAN communication with an access point (AP) over a first frequency band among the plurality of frequency bands, compare, based on a signal of a second frequency band supported by the AP and different from the first frequency band being detected, the first frequency band with the second frequency band, determine, based on the second frequency band being higher than the first frequency band, a change in a strength of a signal received over the first frequency band from the AP, estimate, when the change in the strength indicates an increase in the strength, a link quality for the AP over the second frequency band based on the strength of the signal received over the first frequency band from the AP, and switch the first frequency band for WLAN communication with the AP to the second frequency band based on the link quality.

In accordance with another aspect of the disclosure, an operation method of an electronic device may include performing wireless local area network (WLAN) communication with an access point (AP) over a first frequency band among a plurality of frequency bands supported by the electronic device for WLAN communication, comparing, based on a signal of a second frequency band supported by the AP and different from the first frequency band being detected, the first frequency band with the second frequency band, identifying, based on the second frequency band being higher than the first frequency band, a change in a strength of a signal received over the first frequency band from the AP, estimating, when the change in the strength indicates an increase in the strength, a link quality for the AP over the second frequency band based on the strength of the signal received over the first frequency band from the AP, and switching the first frequency band for WLAN communication with the AP to the second frequency band based on the link quality.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which:

FIG. 4 is a flowchart for controlling frequency bands in the electronic device according to various embodiments;

DETAILED DESCRIPTION

An access point (AP) of a WLAN system may support a plurality of frequency bands (e.g., about 2.4 GHz band, about 5 GHz band, and/or about 6 GHz band). The AP may form plural coverage areas corresponding respectively to the plural frequency bands based on the propagation feature of the frequency bands. For example, the AP may form a relatively wide coverage area based on a relatively low frequency band (e.g., about 2.4 GHz band and/or about 5 GHz band). For example, the AP may form a coverage area narrower than that of the relatively low frequency band based on a frequency band (e.g., about 6 GHz band) higher than the relatively low frequency band.

When an electronic device is moved in a direction from a periphery of the AP to a position where the AP is located, the electronic device may access the AP through a relatively low frequency band (e.g., about 2.4 GHz band and/or about 5

GHz band) having a relatively wide coverage area. When the electronic device is connected to the AP through a relatively low frequency band, the electronic device may maintain the connection with the AP using the relatively low frequency band even if the electronic device is moved to a region where a relatively high frequency band (e.g., about 6 GHz) can be used.

When an electronic device is connected to an AP supporting plural frequency bands, utilization of a relatively high frequency band having a relatively narrow coverage area may be at least partially limited due to a relatively low frequency band having a relatively wide coverage area.

Various embodiments provide an apparatus and method for controlling frequency bands for WLAN communication in an electronic device (e.g., station (STA)) of a WLAN system.

According to some embodiments, the electronic device (e.g., station (STA)) of a WLAN system may change the frequency band for WLAN communication to a target frequency band (e.g., roaming) based on the link quality of the target frequency band, among plural frequency bands supported by an external electronic device (e.g., access point (AP)), even when the serving frequency band is in a strong electric field, so that data communication can be provided to the user of the electronic device in a relatively better network environment, Hereinafter, various embodiments will be described in detail with reference to the accompanying drawings.

Figure 1:
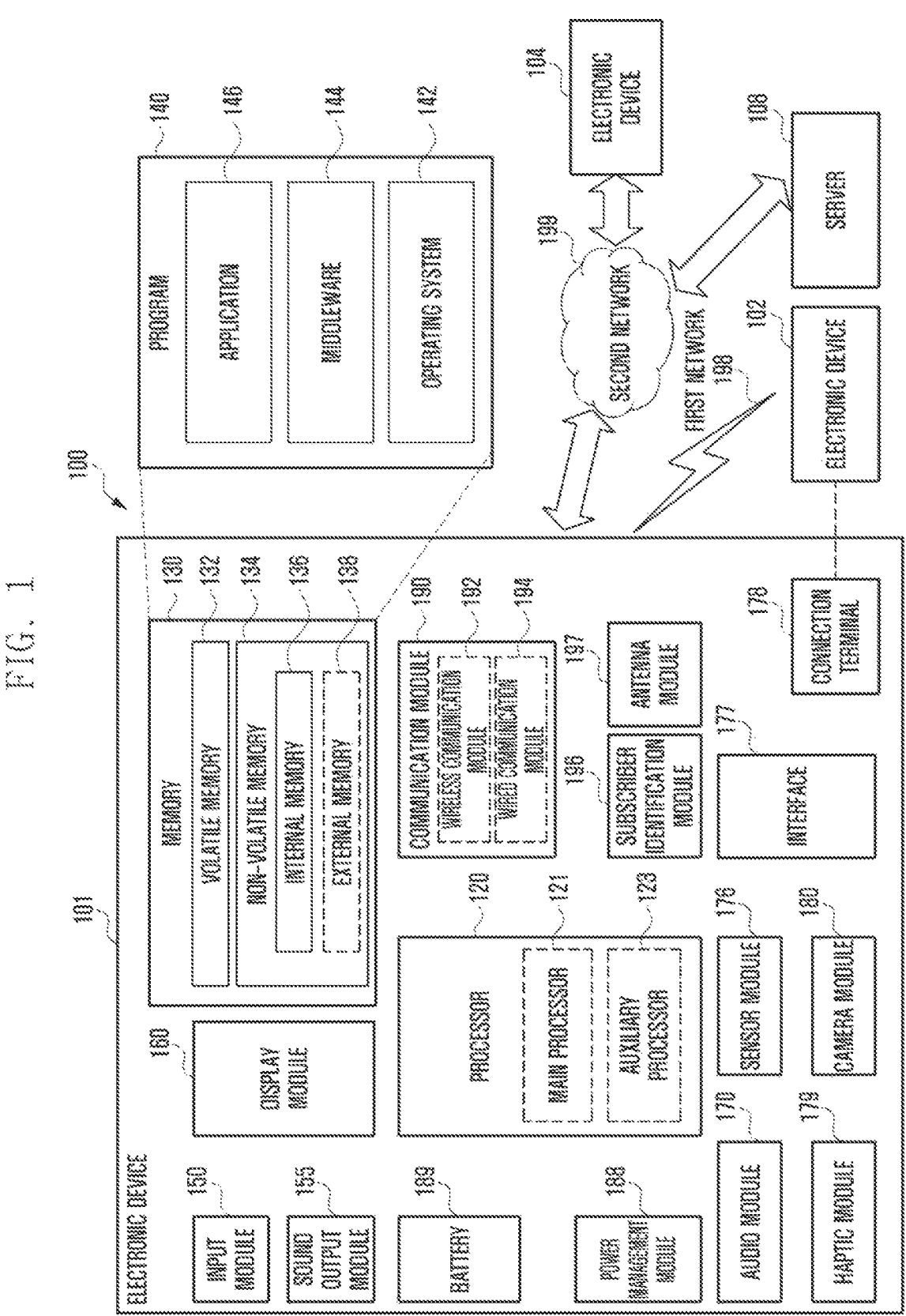
FIG. 1 is a block diagram of an electronic device according to various embodiments.

FIG. 1 is a block diagram illustrating an electronic device in a network environment according to an embodiment of the disclosure. Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an high frequency band (e.g., mmWave) antenna module. According to an embodiment, the high frequency band (e.g., mmWave) antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the electronic device 101 of a WLAN system may transmit and/or receive a management frame, a control frame, and/or a data frame to and/or from an external electronic device through WLAN communication. According to an embodiment, the electronic device 101 may serve as a base station that provides wireless communication to at least one external electronic device located within a service radius related to WLAN communication. For example, the electronic device 101 may include a transport node and/or an access point (AP). According to an embodiment, the management frame may include at least one frame related to a communication connection (e.g., initial communication connection) between the electronic device 101 and an external electronic device based on WLAN communication. According to an embodiment, the control frame may include at least one frame related to control of transmission and/or reception of a data frame in a state where WLAN communication is established between the electronic device 101 and the external electronic device. According to an embodiment, the data frame may include information to be transmitted and/or received by the electronic device 101 and the external electronic device through WLAN communication. For example, the frame may indicate a basic form of a signal and/or data transmitted and/or received between the electronic device 101 and an external electronic device in a WLAN system.

Figure 2:
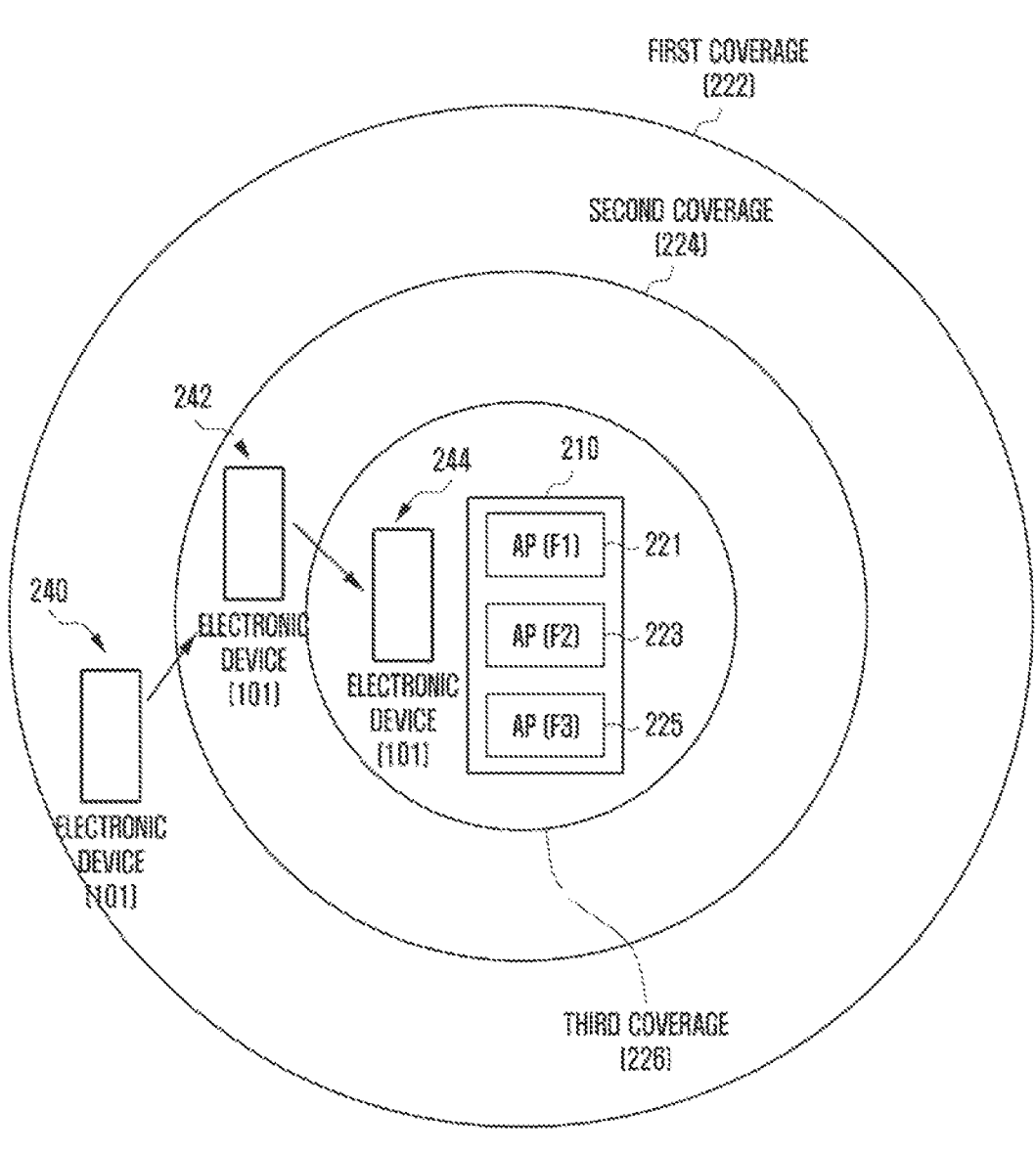
FIG. 2 is the structure of a WLAN system according to various embodiments.

FIG. 2 illustrates a structure of a WLAN system according to various embodiments.

With reference to FIG. 2, an access point (AP) 210 of the WLAN system may support a plurality of frequency bands (e.g., a band of about 2.4 GHz, a band of about 5 GHz, and/or a band of about 6 GHz) 221, 223 and/or 225. According to an embodiment, the AP 210 may include a radio equipment that transmits and/or receives signals and/or data to and/or from the electronic device 101 through WLAN communication based on at least one frequency band. For example, the AP 210 may include at least one communication circuit (e.g., WLAN modem) for processing signals and/or data transmitted and/or received through plural frequency bands. For example, the AP 210 may provide different basic service set (BSS) networks through individual frequency bands. For example, the electronic device 101 may recognize individual frequency bands 221, 223 and 225 supported by the AP 210 as different APs. For example, the band of about 2.4 GHz may include a frequency band of about 2.4 GHz to about 2.5 GHz. For example, the band of about 5 GHz may include a frequency band of about 5 GHz to about 5.9 GHz. For example, the band of about 6 GHz may include a frequency band of about 5.9 GHz to about 7.2 GHz.

According to various embodiments, the AP 210 may form a plurality of coverage areas 222, 224 and/or 226 corresponding respectively to the plurality of frequency bands based on the propagation characteristics of the frequency bands. According to an embodiment, the AP 210 may form a relatively wide first coverage area 222 based on a relatively low frequency band (e.g., about 2.4 GHz band) 221. According to an embodiment, the AP 210 may form a second coverage area 224 narrower than the first coverage area 222 based on a frequency band (e.g., about 5 GHz band) 223 higher than the relatively low frequency band (e.g., about 2.4 GHz band). According to an embodiment, the AP 210 may form a third coverage area 226 narrower than the first coverage area 222 and the second coverage area 224 based on a relatively high frequency band (e.g., about 6 GHz band) 225. For example, the first coverage area 222, the second coverage area 224, and the third coverage area 226 may at least partially overlap with respect to the AP 210. For example, the third coverage area 226 may overlap at least a portion of the second coverage area 224. For example, the second coverage area 224 may overlap at least a portion of the first coverage area 222.

According to various embodiments, when the electronic device 101 is located within the first coverage area 222 of the AP 210 (240), the electronic device 101 may communicate with the AP 210 through the frequency band 221 (e.g., about 2.4 GHz band) associated with the first coverage area 222. According to an embodiment, when the electronic device 101 is located in a first area 240 that does not overlap the second coverage area 224 within the first coverage area 222 of the AP 210, the electronic device 101 may perform WLAN communication with the AP 210 based on the relatively low frequency band 221 (e.g., about 2.4 GHz band) associated with the first coverage area 222.

According to various embodiments, when the electronic device 101 is moved into the second coverage area 224 while WLAN communication is being connected with the AP 210 based on the frequency band 221 (e.g., about 2.4 GHz band) associated with the first coverage area 222 (242), the electronic device 101 may switch the WLAN connection with the AP 210 to the frequency band 223 (e.g., about 5 GHz band) associated with the second coverage area 224. According to an embodiment, when the electronic device 101 is moved from the first area 240 to the second area 242 that does not overlap the third coverage area 226 within the second coverage area 224, the electronic device 101 may estimate the link quality for WLAN communication with the AP 210 over the frequency band 223 (e.g., about 5 GHz band) associated with the second coverage area 224 on the basis of the quality of the link connected with the AP 210 over the frequency band 221 (e.g., about 2.4 GHz band) associated with the first coverage area 222. Upon determining that the ratio of the estimated link quality for WLAN communication with the AP 210 over the frequency band 223 (e.g., about 5 GHz band) associated with the second coverage area 224 to the link quality with the AP 210 connected over the frequency band 221 (e.g., about 2.4 GHz band) associated with the first coverage area 222 satisfies a specified frequency switching condition, the electronic device 101 may switch the frequency band for WLAN communication with the AP 210 from the frequency band 221 (e.g., about 2.4 GHz band) associated with the first coverage area 222 to the frequency band 223 (e.g., about 5 GHz band) associated with the second coverage area 224.

According to various embodiments, when the electronic device 101 determines that it is moved into the third coverage area 226 while WLAN communication is being connected with the AP 210 based on the frequency band 223 (e.g., about 5 GHz band) associated with the second coverage area 224 (244), the electronic device 101 may switch the WLAN connection with the AP 210 to the frequency band 224 (e.g., about 6 GHz band) associated with the third coverage area 226. According to an embodiment, when the electronic device 101 is moved from the second area 242 to the third area 244 within the third coverage area 226, the electronic device 101 may estimate the link quality for WLAN communication with the AP 210 over the frequency band 225 (e.g., about 6 GHz band) associated with the third coverage area 226 on the basis of the quality of the link connected with the AP 210 over the frequency band 223 (e.g., about 5 GHz band) associated with the second coverage area 224. Upon determining that the ratio of the estimated link quality for WLAN communication with the AP 210 over the frequency band 225 (e.g., about 6 GHz band) associated with the third coverage area 226 to the link quality with the AP 210 connected over the frequency band 223 (e.g., about 5 GHz band) associated with the second coverage area 224 satisfies a specified frequency switching condition, the electronic device 101 may switch the frequency band for WLAN communication with the AP 210 from the frequency band 223 (e.g., about 5 GHz band) associated with the second coverage area 222 to the frequency band 225 (e.g., about 6 GHz band) associated with the third coverage area 226.

According to various embodiments, the AP 210 may include a plurality of APs supporting different frequency bands.

Figure 3:
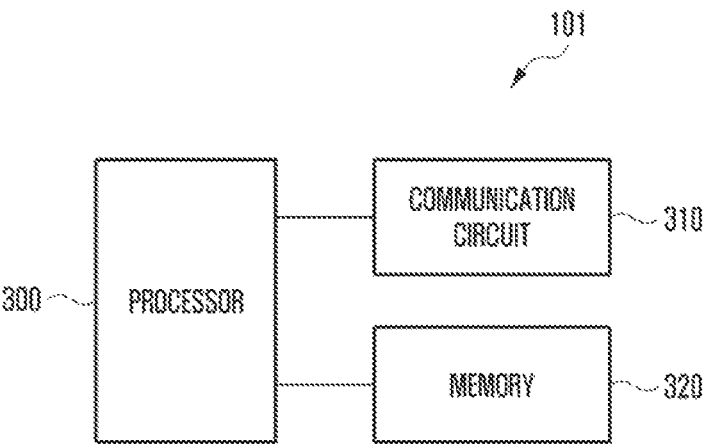
FIG. 3 is a block diagram of an electronic device for controlling frequency bands according to various embodiments.

FIG. 3 is a block diagram of an electronic device for controlling frequency bands according to various embodiments.

According to various embodiments with reference to FIG. 3, the electronic device 101 may include a processor 300, a communication circuit 310, and/or a memory 320. According to an embodiment, the processor 300 may be substantially the same as the processor 120 in FIG. 1 or may include the processor 120. The communication circuit 310 may be substantially the same as the wireless communication mod-ule 192 in FIG. 1, or may include the wireless communication module 192. The memory 320 may be substantially the same as the memory 130 in FIG. 1, or may include the memory 130. According to an embodiment, the processor 300 may be operably connected to the communication circuit 310 and/or the memory 320.

According to various embodiments, when the electronic device 101 is connected in WLAN communication with the AP 210 over a first frequency band, the processor 300 may check whether there is a second frequency band different from the first frequency band usable for WLAN communication with the AP 210. For example, the first frequency band may indicate a frequency band being used for WLAN communication between the electronic device 101 and the AP 210 among the plural frequency bands supported by the AP 210. For example, the second frequency band may indicate a frequency band usable for WLAN communication between the electronic device 101 and the AP 210 among at least one frequency band excluding the first frequency band from the plural frequency bands supported by the AP 210. For example, the frequency band usable for WLAN communication between the electronic device 101 and the AP 210 may indicate a frequency band supported by the AP 210 and detected by the electronic device 101 through a scan except for the first frequency band.

According to an embodiment, the processor 300 may identify whether there is at least one different frequency band other than the first frequency band supported by the AP 210 on the basis of reduced neighbor report (RNR) information obtained over the first frequency band through the communication circuit 310 from the AP 210. For example, the processor 300 may identify whether there is at least one different frequency band other than the first frequency band supported by the AP 210 based on the setting value of "co-located AP" of RNR basic service set (BSS) parameters included in the RNR information obtained from the AP 210 over the first frequency band. For instance, when "co-located AP" has a first value (e.g., '1'), the processor 300 may determine that there is at least one different frequency band other than the first frequency band supported by the AP 210. For instance, when "co-located AP" has a second value (e.g., '0'), the processor 300 may determine that there is no frequency band other than the first frequency band supported by the AP 210. For example, the RNR information may be included in a beacon signal, a file discovery signal, or a probe response signal received over the first frequency band from the AP 210. For example, the processor 300 may identify whether there is at least one different frequency band (or frequency) other than the first frequency band supported by the AP 210 based on an operating class and a channel number included in the neighbor AP information field of the RNR information obtained from the AP 210. For instance, the operating class may include information about a frequency band other than the first frequency band supported by the AP 210. For instance, the channel number may include information about a channel used for WLAN communication with the AP 210 in a frequency band other than the first frequency band supported by the AP 210.

According to an embodiment, when a frequency band other than the first frequency band supported by the AP 210 is found through the scan, the processor 300 may determine that there is a second frequency band usable for WLAN communication with the AP 210. For example, the scan may include a passive scan and/or an active scan. For instance, the passive scan may include a series of operations in which the electronic device 101 searches for an AP to which the electronic device 101 can connect by receiving a signal (e.g., beacon) transmitted by the AP 210 without transmitting a separate signal. For instance, the active scan may include a series of operations in which the electronic device 101 searches for a connectable AP by receiving a response signal (e.g., probe response) from the AP 210 in reply to a scan-related signal (e.g., probe request).

According to various embodiments, when a second frequency band usable for WLAN communication with the AP 210 is detected in a state where WLAN communication is connected with the AP 210 over the first frequency band, the processor 300 may determine whether it is possible to switch the frequency band for WLAN communication with the AP 210 from the first frequency band to the second frequency band. According to an embodiment, when the second frequency band is higher than the first frequency band, the processor 300 may determine that it is possible to switch the frequency band for WLAN communication with the AP 210 from the first frequency band to the second frequency band.

According to an embodiment, upon determining that it is possible to switch the frequency band for WLAN communication with the AP 210 to the second frequency band, the processor 300 may store at least one of received signal strength related to WLAN communication with the AP 210 over the first frequency band, an airtime fraction of the second frequency band, a difference between received signal strength for WLAN communication with the AP 210 using the first frequency band and received signal strength for WLAN communication using the second frequency band (e.g., a difference in received signal strength between first frequency band and second frequency band), robust security network (RSN), high efficiency (HE), high throughput (HT), or very high throughput (VHT), which is obtained through scanning, in the memory 320.

According to various embodiments, upon determining that it is possible to switch the frequency band for WLAN communication with the AP 210 to the second frequency band, the processor 300 may determine whether the electronic device 101 is moved to a location where the AP 210 is installed (or deployed). According to an embodiment, the processor 300 may detect a change in received signal strength of the AP 210 based on a beacon signal, a file discovery signal, or a probe response signal received through the first frequency band from the AP 210. For example, a change in received signal strength of the AP 210 may be detected based on a difference between received signal strengths of the AP 210 obtained at different time points. When the received signal strength of the AP 210 increases, the processor 300 may determine that the electronic device 101 is moved to a location where the AP 210 is installed (or deployed). According to an embodiment, the processor 300 may determine whether the electronic device 101 is moved to a location where the AP 210 is installed (or deployed) by using a global navigation satellite system (GNSS) module (not shown), a location-based service (LBS) such as Wi-Fi positioning system (WPS), and/or an inertial measurement unit (IMU) (e.g., acceleration sensor, gyro sensor and/or geomagnetic sensor) (not shown) of the electronic device 101. For example, the location where the AP 210 is installed (or deployed) may indicate the central area of the coverage area formed by the AP 210 for WLAN communication (e.g., first coverage area 222, second coverage area 224, and/or third coverage area 226 in FIG. 2).

According to various embodiments, upon determining that the electronic device 101 is moved to a location where the AP 210 is installed (or deployed), the processor 300 may check the link quality for WLAN communication with the AP 210 based on the second frequency band. According to an embodiment, the processor 300 may estimate the received signal strength of the AP 210 over the second frequency band based on the received signal strength of the AP 210 most recently obtained over the first frequency band and the difference in received signal strength between first frequency band and the second frequency band stored in the memory 320. According to an embodiment, the processor 300 may estimate the link quality for WLAN communication with the AP 210 over the second frequency band based on the received signal strength of the AP 210 over the second frequency band and the airtime fraction of the AP 210 over the second frequency band. For example, the airtime fraction of the AP 210 over the second frequency band may be obtained from the memory 320 or may be obtained based on information about channel utilization.

According to various embodiments, the processor 300 may control the communication circuit 310 to switch the frequency band for WLAN communication with the AP 210 from the first frequency band to the second frequency band based on the link quality for WLAN communication with the AP 210 over the second frequency band. According to an embodiment, upon determining that the link quality for WLAN communication with the AP 210 over the first frequency band, compared to the link quality for WLAN communication with the AP 210 over the second frequency band, satisfies a specified frequency switching condition, the processor 300 may determine to switch the frequency band for WLAN communication with the AP 210 to the second frequency band. According to an embodiment, upon determining to switch the frequency band for WLAN communication with the AP 210 to the second frequency band, the processor 300 may control the communication circuit 310 to switch the frequency band for WLAN communication with the AP 210 to the second frequency band. According to an embodiment, upon determining to switch the frequency band for WLAN communication with the AP 210 to the second frequency band, the processor 300 may control the communication circuit 310 to perform a scan related to the second frequency band. Upon determining that the link quality of the second frequency band obtained through the scan is better than the link quality of the first frequency band, the processor 300 may control the communication circuit 310 to switch the frequency band for WLAN communication with the AP 210 to the second frequency band.

According to various embodiments, the communication circuit 310 may support WLAN communication between the electronic device 101 and an external electronic device (e.g., AP 210). According to an embodiment, the communication circuit 310 may include at least one communication circuit (e.g., WLAN modem) for processing signals and/or data transmitted and/or received through plural frequency bands.

According to various embodiments, the memory 320 may store various data used by at least one component of the electronic device 101 (e.g., processor 300 and/or communication circuit 310). According to an embodiment, the memory 310 may store various instructions that may be executed through the processor 300.

According to various embodiments, an electronic device (e.g., electronic device 101 in FIG. 1, 2 or 3) may include: a memory (e.g., memory 130 in FIG. 1 or memory 320 in FIG. 3); a communication circuit (e.g., wireless communication module 192 in FIG. 1 or communication circuit 310 in FIG. 3) to support a plurality of frequency bands for WLAN communication; and a processor (e.g., processor 120 in FIG. 1 or processor 300 in FIG. 3) operably connected to the memory and the communication circuit, wherein the processor may be configured to establish WLAN communication with an access point (AP) through a first frequency band among plural frequency bands, compare, when a signal of a second frequency band different from the first frequency band supported by the AP is detected through a scan, the first frequency band with the second frequency band, identify, if the second frequency band is higher than the first frequency band, a change in strength of a signal received through the first frequency band from the AP, estimate the link quality of the AP through the second frequency band based on the strength of the signal received through the first frequency band from the AP when the strength of the signal received through the first frequency band from the AP increases, and switch the frequency band for WLAN communication with the AP to the second frequency band based on the link quality of the AP through the second frequency band.

According to various embodiments, the processor may identify whether the AP supports at least one different frequency band other than the first frequency band based on reduced neighbor report (RNR) information obtained through the first frequency band from the AP.

According to various embodiments, the RNR information may be included in a beacon signal, a file discovery signal, or a probe response signal.

According to various embodiments, upon determining that the AP supports at least one different frequency band other than the first frequency band, the processor may identify the at least one different frequency band based on the RNR information obtained through the first frequency band from the AP, and search for the at least one different frequency band through the scan.

According to various embodiments, if the second frequency band is higher than the first frequency band, the processor may store, in the memory, information about at least one of a difference between the strength of a signal received from the AP over the first frequency band obtained through the scan and the strength of a signal received from the AP over the second frequency band, the airtime fraction of the second frequency band, or the strength of a signal received from the AP over the first frequency band.

According to various embodiments, if the second frequency band is higher than the first frequency band, the processor may further store, in the memory, information about at least one of robust security network (RSN), high efficiency (HE), high throughput (HT), or very high throughput (VHT) obtained through the scan in relation to the second frequency band.

According to various embodiments, the processor may estimate the strength of a signal received from the AP over the second frequency band based on the strength of a signal received from the AP over the first frequency band and the difference, stored in the memory, between the strength of a signal received from the AP over the first frequency band and the strength of a signal received from the AP over the second frequency band, and may estimate the link quality of the AP over the second frequency band based on the estimated strength of a signal received from the AP over the second frequency band and the airtime fraction of the second frequency band.

According to various embodiments, when the strength of a signal received from the AP through the first frequency band increases, the processor may determine that the electronic device is moved in a direction in which the AP is located, and may estimate, in case of determining that the electronic device is moved in a direction in which the AP is located, the link quality with the AP over the second frequency band based on the strength of a signal received from the AP over the first frequency band.

According to various embodiments, when the link quality with the AP over the second frequency band satisfies a specified frequency switching condition, the processor may switch the frequency band for WLAN communication with the AP to the second frequency band. For example, in some embodiments, when the link quality is greater than or equal to a threshold quality, the processor may switch the frequency band to the second frequency band.

According to various embodiments, when the link quality with the AP over the second frequency band satisfies the specified frequency switching condition, the processor may perform a scan related to the second frequency band, and switch the frequency band for WLAN communication with the AP to the second frequency band based on the scan result related to the second frequency band.

FIG. 4 is a flowchart 400 for controlling frequency bands in the electronic device according to various embodiments. In flowchart 400, operations may be performed in sequence but are not necessarily required to be performed in sequence. For example, the order of operations may be changed, and at least two operations may be performed in parallel. According to an embodiment, the electronic device of FIG. 4 may be the electronic device 101 in FIG. 1, 2 or 3.

According to various embodiments with reference to FIG. 4, at operation 401, the electronic device (e.g., processor 120 or wireless communication module 192 in FIG. 1, processor 300 or communication circuit 310 in FIG. 3) may perform WLAN communication with the AP 210 over a first frequency band. For example, in some embodiments, the electronic device may connect to the AP over the first frequency band. According to an embodiment, the processor 300 may obtain information about at least one AP to which the electronic device 101 can connect through a scan using the communication circuit 310. The processor 300 may control the communication circuit 310 to connect to the AP 210 over the first frequency band among the at least one AP to which the electronic device 101 can connect based on the received signal strength, access history, and/or user input of the at least one AP to which the electronic device 101 can connect. For example, the first frequency band may include a frequency band being used for WLAN communication with the electronic device 101 among plural frequency bands supported by the AP 210 (e.g., F1 221, F2 223 and/or F3 225 in FIG. 2).

According to various embodiments, at operation 403, the electronic device (e.g., processor 120 or 300, wireless communication module 192, or communication circuit 310) may determine whether there is a second frequency band different from the first frequency band that is usable for WLAN communication with the AP 210. For example, in some embodiments, it may be determined whether the second frequency band of the AP 210 is detected. For example, the second frequency band may indicate a frequency band usable for WLAN communication between the electronic device 101 and the AP 210 among at least one frequency band excluding the first frequency band from the plural frequency bands supported by the AP 210. For example, the frequency band usable for WLAN communication between the electronic device 101 and the AP 210 may include frequency bands supported by the AP 210 except for the first frequency band detected by the electronic device 101 through a scan.

According to an embodiment, the processor 300 may identify whether there is at least one different frequency band other than the first frequency band supported by the AP 210 based on reduced neighbor report (RNR) information obtained over the first frequency band from the AP 210.

Upon determining that there is at least one different frequency band other than the first frequency band supported by the AP 210, the processor 300 may obtain information about a frequency band other than the first frequency band supported by the AP 210 based on the neighbor AP information field of the RNR information. When a frequency band other than the first frequency band supported by the AP 210 is found through a scan using the communication circuit 310, the processor 300 may determine that there is a second frequency band usable for WLAN communication with the AP 210. For instance, the scan may include a passive scan and/or an active scan.

According to various embodiments, upon determining that there is no second frequency band different from the first frequency band usable for WLAN communication with the AP 210 (e.g., 'no' at operation 403), the electronic device (e.g., processor 120 or 300, wireless communication module 192, or communication circuit 310) may end the process for controlling frequency bands for WLAN communication.

According to various embodiments, upon determining that there is a second frequency band different from the first frequency band usable for WLAN communication with the AP 210 (e.g., 'yes' at operation 403), at operation 405, the electronic device (e.g., processor 120 or 300, wireless communication module 192, or communication circuit 310) may check whether the first frequency band is lower than the second frequency band.

According to various embodiments, upon determining that the first frequency band is not lower than the second frequency band (e.g., 'no' at operation 405), the electronic device (e.g., processor 120 or 300, wireless communication module 192, or communication circuit 310) may end the process for controlling frequency bands for WLAN communication. According to an embodiment, if the first frequency band is higher than the second frequency band, the processor 300 may determine that switching of the frequency band for WLAN communication with the AP 210 is unnecessary.

According to various embodiments, upon determining that the first frequency band is lower than the second frequency band (e.g., 'yes' at operation 405), at operation 407, the electronic device (e.g., processor 120 or 300, wireless communication module 192, or communication circuit 310) may check movement (e.g., movement direction) of the electronic device 101. According to an embodiment, upon determining that the first frequency band is lower than the second frequency band, the processor 300 may determine whether it is possible to switch the frequency band for WLAN communication with the AP 210 from the first frequency band to the second frequency band. Upon determining that it is possible to switch the frequency band for WLAN communication with the AP 210 to the second frequency band, the processor 30 may store at least one of received signal strength for WLAN communication with the AP 210 over the first frequency band, airtime fraction of the second frequency band, difference between received signal strength for WLAN communication with the AP 210 using the first frequency band and received signal strength for WLAN communication using the second frequency band, RSN, HE, HT, or VHT, which is obtained through scanning, in the memory 320.

According to an embodiment, upon determining that it is possible to switch the frequency band for WLAN communication with the AP 210 to the second frequency band, the processor 300 may detect a change in received signal strength for WLAN communication based on a beacon signal, a file discovery signal, or a probe response signal received from the AP 210 through the first frequency band. For example, when the received signal strength for WLAN communication with the AP 210 increases, the processor 300 may determine that the electronic device 101 is moved to a location where the AP 210 is installed (or deployed). For example, when the received signal strength for WLAN communication with the AP 210 decreases, the processor 300 may determine that the electronic device 101 is moved in a direction opposite to a position where the AP 210 is installed (or deployed). According to an embodiment, the processor 300 may identify the movement direction of the electronic device 101 by using a GNSS module (not shown), an LBS, and/or an inertial measurement unit (IMU) (not shown) of the electronic device 101.

According to various embodiments, at operation 409, the electronic device (e.g., processor 120 or 300, wireless communication module 192, or communication circuit 310) may determine whether the electronic device 101 is moved toward a location where the AP 210 is installed (or deployed) based on the movement of the electronic device 101. For example, in some embodiments, the electronic device (or processor (300)) may determine whether the electronic device 101 is moved closer to the AP 210.

According to various embodiments, upon determining that the electronic device 101 is not moved toward a location where the AP 210 is installed (or deployed) (e.g., 'no' at operation 409), the electronic device (e.g., processor 120 or 300, wireless communication module 192, or communication circuit 310) may end the process for controlling frequency bands for WLAN communication. According to an embodiment, when determined that the electronic device 101 is not moved toward a location where the AP 210 is installed (or deployed), the processor 300 may determine that there is a high possibility that the electronic device 101 exits the coverage area corresponding to the second frequency band (e.g., second coverage area 224 in FIG. 2). Based on a determination that there is a high possibility that the electronic device 101 exits the coverage area corresponding to the second frequency band (e.g., second coverage area 224 in FIG. 2), the processor 300 may determine that switching to the second frequency band is unnecessary for WLAN communication with the AP 210.

According to various embodiments, upon determining that the electronic device 101 is moved toward a location where the AP 210 is installed (or deployed) (e.g., 'yes' at operation 409), at operation 411, the electronic device (e.g., processor 120 or 300, wireless communication module 192, or communication circuit 310) may estimate the link quality of WLAN communication with the AP 210 over the second frequency band. In some embodiments, the electronic device (or processor (300)) may estimate the link quality for the AP 210 over the second frequency band. According to an embodiment, the processor 300 may estimate the received signal strength of the AP 210 over the second frequency band based on the received signal strength of the AP 210 most recently obtained over the first frequency band and the difference in received signal strength between the first frequency band and the second frequency band stored in the memory 320. For instance, the received signal strength of the AP 210 most recently obtained over the first frequency band may be obtained at a time point (or, scan) different from that of the received signal strength of the AP 210 obtained over the first frequency band used to detect the difference in received signal strength between the first frequency band and the second frequency band stored in the memory 320.

According to an embodiment, the processor 300 may estimate the link quality over the second frequency band for WLAN communication with the AP 210 based on the received signal strength of the AP 210 over the second frequency band and the airtime fraction of the AP 210 over the second frequency band.

According to various embodiments, at operation 413, the electronic device (e.g., processor 120 or 300, wireless communication module 192, or communication circuit 310) may connect to the AP 210 over the second frequency band based on the link quality of WLAN communication with the AP 210 over the second frequency band. According to an embodiment, upon determining that the link quality for WLAN communication with the AP 210 over the first frequency band, compared to the link quality for WLAN communication with the AP 210 over the second frequency band, satisfies a specified frequency switching condition (for example, that the link quality over the first frequency band is less than the link quality over the second frequency band), the processor 300 may determine to switch the frequency band for WLAN communication with the AP 210 from the first frequency band to the second frequency band. For example, when the link quality for WLAN communication with the AP 210 over the first frequency band does not satisfy a specified roaming condition (or specified handover condition), the processor 300 may also determine to switch the frequency band for WLAN communication with the AP 210 to the second frequency band based on the link quality of WLAN communication with the AP 210 over the second frequency band. For instance, the state in which the specified roaming condition (or specified handover condition) is not satisfied may include a communication state capable of maintaining WLAN communication with the AP 210 over the first frequency band. According to an embodiment, upon determining to switch the frequency band for WLAN communication with the AP 210 to the second frequency band, the processor 300 may control the communication circuit 310 to switch the frequency band for WLAN communication with the AP 210 to the second frequency band. According to an embodiment, upon determining to switch the frequency band for WLAN communication with the AP 210 to the second frequency band, the processor 300 may control the communication circuit 310 to perform a scan related to the second frequency band. When it is determined that the link quality of WLAN communication with the AP 210 over the second frequency band obtained through the scan related to the second frequency band is better than the link quality with the AP 210 over the first frequency band, the processor 300 may control the communication circuit 310 to switch the frequency band for WLAN communication with the AP 210 to the second frequency band.

Figure 5:
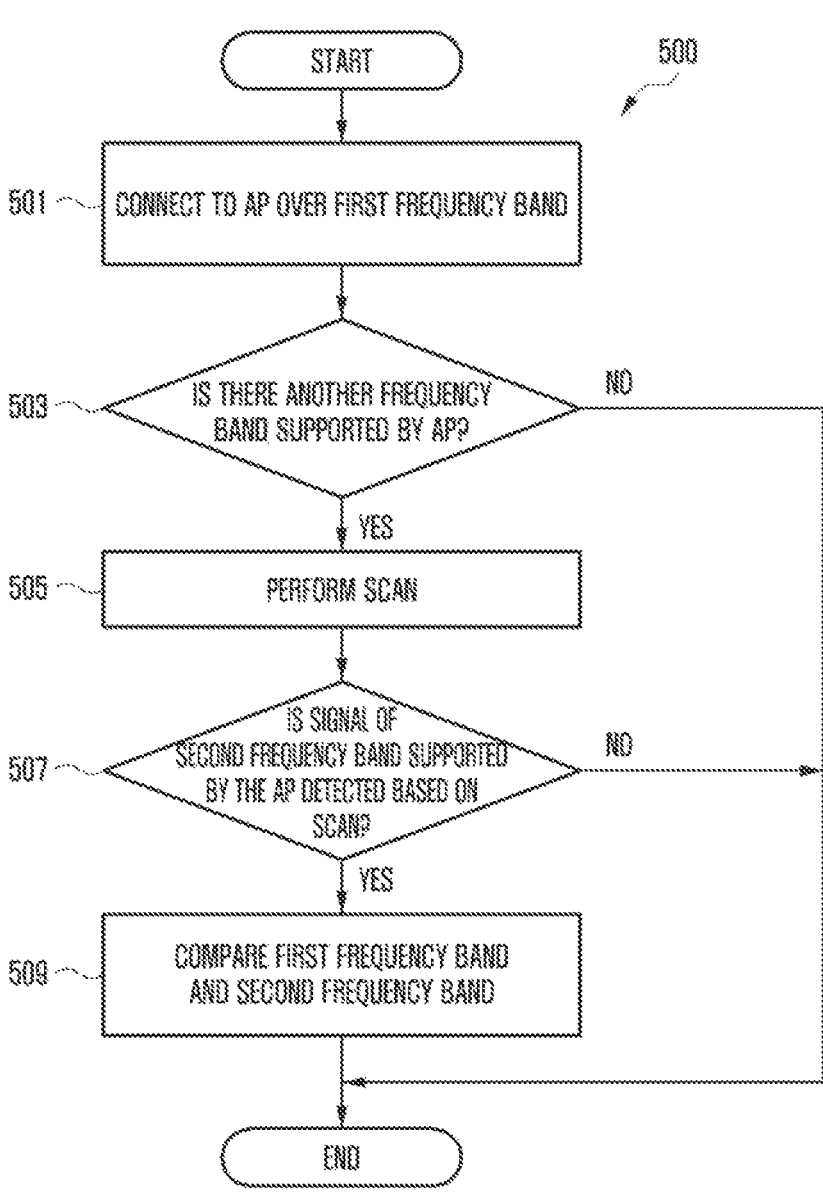
FIG. 5 is a flowchart for the electronic device to identify plural frequency bands supported by the AP according to various embodiments.

FIG. 5 is a flowchart 500 for the electronic device to identify plural frequency bands supported by the AP according to various embodiments. According to an embodiment, at least some of FIG. 5 may be detailed ones of operations 401 and 403 in FIG. 4. In the flowchart 500, operations may be performed in sequence but are not necessarily required to be performed in sequence. For example, the order of operations may be changed, and at least two operations may be performed in parallel. According to an embodiment, the electronic device of FIG. 5 may be the electronic device 101 of FIG. 1, 2 or 3.

According to various embodiments with reference to FIG. 5, at operation 501, the electronic device (e.g., processor 120 or wireless communication module 192 in FIG. 1, or processor 300 or communication circuit 310 in FIG. 3) may connect to the AP 210 over a first frequency band supported by the AP 210. According to an embodiment, the processor 300 (e.g., communication processor (CP)) may receive a beacon signal periodically transmitted by an external electronic device (e.g., AP 210) through the communication circuit 310. When a beacon signal is received through the communication circuit 310, the processor 300 may control the communication circuit 310 to transmit a probe request signal to the external electronic device (e.g., AP 210). When a probe response signal is received through the communication circuit 310 in correspondence to the probe request signal, the processor 300 may control the communication circuit 310 to perform an authentication procedure with the external electronic device (e.g., AP 210). When authentication with the external electronic device (e.g., AP 210) is completed (or successful), the processor 300 may determine that WLAN communication is established with the external electronic device (e.g., AP 210).

According to various embodiments, at operation 503, the electronic device (e.g., processor 120 or 300, wireless communication module 192, or communication circuit 310) may determine whether there is another frequency band supported by the AP 210. According to an embodiment, the processor 300 may identify whether there is at least one different frequency band other than the first frequency band supported by the AP 210 based on reduced neighbor report (RNR) information obtained from the AP 210 over the first frequency band. For example, the processor 300 may obtain RNR information configured as shown in Table 1 (e.g., IEEE 802.11 standard) from the AP 210 over the first frequency band. For instance, as shown in Table 1, the RNR information may include RNR element ID, length, and/or neighbor AP information (neighbor AP information field).

TABLE 1

|  | Element ID | Length | Neighbor AP Information Fields |
|---|---|---|---|
| Octets: | 1 | 1 | variable |

For example, as shown in Table 2 (e.g., IEEE 802.11 standard), the neighbor AP information of the RNR information may include TBTT (target beacon transmission time) information header, operating class, channel number, and/or TBTT information set.

TABLE 2

|  | TBTT Information Header | Operating Class | Channel Number | TBTT Information Set |
|---|---|---|---|---|
| Octets: | 2 | 1 | 1 | variable |

For example, as shown in Table 3 (e.g., IEEE 802.11 standard), the TBTT information set of the neighbor AP information may include neighbor AP TBTT offset, basic service set identifier (BSSID), short SSID (short-SSID), BSS parameters, and/or 20 MHz power spectral density (PSD).

TABLE 3

|  | Neighbor AP TBTT Offset | BSSID (Optional) | Short-SSID (Optional) | BSS parameters | 20 MHz PSD |
|---|---|---|---|---|---|
| Octets: | 1 | 0 or 6 | 0 or 1 | 0 or 1 | 0 or 4 |

For example, the processor 300 may identify whether there is at least one different frequency band other than the first frequency band supported by the AP 210 based on the setting value of "co-located AP" included in the basic service set (BSS) parameters configured as shown in Table 4 (e.g., IEEE 802.11 standard). For example, the RNR information may be included in a beacon signal, a file discovery signal, or a probe response signal received over the first frequency band from the AP 210.

TABLE 4

| | B0 OCT Recommended | B1 Same SSID | B2 Multiple SSID | B3 Transmitted BSSID | B4 Member Of ESS With 2.4/5 GHz Co-Located AP | B5 Unsolicited Probe Responses Active | B6 Co-Located AP | B7 Reserved |
|---|---|---|---|---|---|---|---|---|
| Bits: | 1 | 1 | 1 | 1 | 1 | 1 | 1 | 1 |

According to various embodiments, upon determining that there is no frequency band other than the first frequency band supported by the AP 210 (e.g., 'no' at operation 503), the electronic device (e.g., processor 120 or 300, wireless communication module 192, or communication circuit 310) may end the process for identifying plural frequency bands supported by the AP.

According to various embodiments, upon determining that there is another frequency band other than the first frequency band supported by the AP 210 (e.g., 'yes' at operation 503), at operation 505, the electronic device (e.g., processor 120 or 300, wireless communication module 192, or communication circuit 310) may perform a scan. For example, in some embodiments, the electronic device may perform the scan to search for at least one AP to which the electronic device 101 can connect. According to an embodiment, when a scan periodicity for the WLAN of the electronic device 110 arrives, the processor 300 may control the communication circuit 310 to perform a scan. According to an embodiment, the processor 300 may identify at least one different frequency band (or frequency) other than the first frequency band supported by the AP 210 based on the operating class and channel number included in the RNR neighbor AP information field of Table 2. When a scan periodicity for the WLAN of the electronic device 110 arrives, the processor 300 may control the communication circuit 310 to perform a scan related to at least one different frequency band (or frequency) other than the first frequency band supported by the AP 210.

According to various embodiments, at operation 507, the electronic device (e.g., processor 120 or 300, wireless communication module 192, or communication circuit 310) may determine whether a signal of a second frequency band supported by the AP 210 is detected based on the scan result. According to an embodiment, if the frequency band of a signal detected through the scan corresponds to a remaining frequency band except for the first frequency band among the plural frequency bands supported by the AP 210, the processor 300 may determine that a signal of the second frequency band of the AP 210 is detected.

According to various embodiments, if a signal of a second frequency band supported by the AP 210 is not detected (e.g., 'no' at operation 507), the electronic device (e.g., processor 120 or 300, wireless communication module 192, or communication circuit 310) may end the process for identifying plural frequency bands supported by the AP.

If a signal of a second frequency band supported by the AP 210 is detected (e.g., 'yes' at operation 507), at operation 509, the electronic device (e.g., processor 120 or 300, wireless communication module 192, or communication circuit 310) may compare the first frequency band and the second frequency band. For example, in some embodiments, the electronic device (or processor 300) may compare the first frequency band and the second frequency band to identify a higher frequency band among the first frequency band and the second frequency band. According to an embodiment, the processor 300 may determine whether the first frequency band is a lower frequency band than the second frequency band (e.g., operation 405 in FIG. 4) based on the result of comparison between the first frequency band and the second frequency band.

Figure 6:
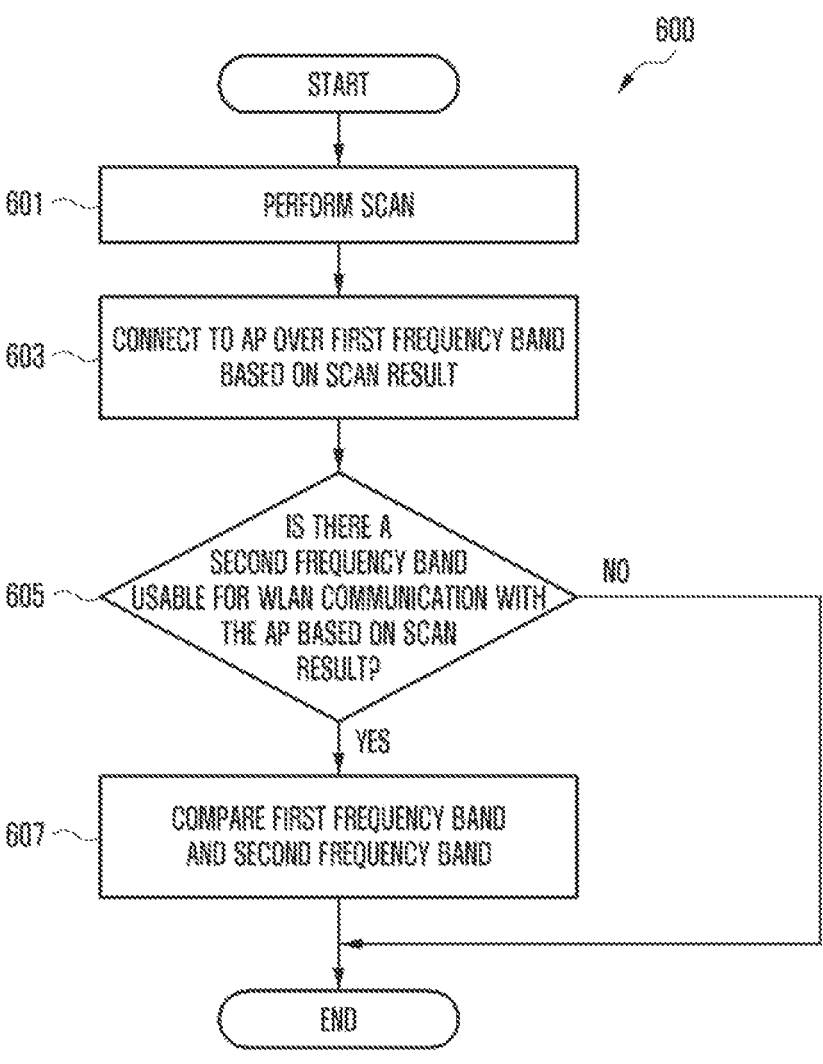
FIG. 6 is a flowchart for the electronic device to identify plural frequency bands supported by the AP according to various embodiments.

FIG. 6 is a flowchart 600 for the electronic device to identify plural frequency bands supported by the AP according to various embodiments. According to an embodiment, at least some of FIG. 6 may be detailed ones of operations 401 and 403 in FIG. 4. In the flowchart 600, operations may be performed in sequence but are not necessarily requested to be performed in sequence. For example, the order of operations may be changed, and at least two operations may be performed in parallel. According to an embodiment, the electronic device of FIG. 6 may be the electronic device 101 of FIG. 1, 2 or 3.

According to various embodiments with reference to FIG. 6, at operation 601, the electronic device (e.g., processor 120 or wireless communication module 192 in FIG. 1, or processor 300 or communication circuit 310 in FIG. 3) may perform a scan. For example, in some embodiments, the electronic device (or processor 300) may perform the scan to search for at least one AP to which the electronic device 101 can connect. According to an embodiment, when detecting an occurrence of a WLAN access event, the processor 300 may control the communication circuit 310 to perform a scan. For example, a WLAN access event may be generated according to execution of the application processor related to WLAN activation, a user input, and/or information received from an external electronic device. According to an embodiment, when a scan periodicity for the WLAN of the electronic device 110 arrives, the processor 300 may control the communication circuit 310 to perform a scan.

According to various embodiments, at operation 603, the electronic device (e.g., processor 120 or 300, wireless communication module 192, or communication circuit 310) may connect to the AP 210 over a first frequency band based on the scan result. According to an embodiment, the processor 300 may obtain information related to at least one AP to which the electronic device 101 can connect through a scan using the communication circuit 310. The processor 300 may control the communication circuit 310 to connect to the AP 210 over a first frequency band among at least one AP to which the electronic device 101 can connect on the basis of the received signal strength, access history, and/or user input for at least one AP accessible by the electronic device

101. For example, the processor 300 may connect to an AP having the highest received signal strength among at least one AP found through a scan. For example, the processor 300 may connect to an AP having an access history among at least one AP found through a scan whose received signal strength exceeds a specified reference strength.

According to various embodiments, at operation 605, the electronic device (e.g., processor 120 or 300, wireless communication module 192, or communication circuit 310) may determine whether there is a second frequency band different from the first frequency band usable for WLAN communication with the AP 210 based on the scan result. According to an embodiment, the processor 300 may identify whether there is at least one different frequency band other than the first frequency band supported by the AP 210 based on the setting value of "co-located AP" in the BSS parameters configured as shown in Table 4 of the RNR information obtained from the AP 210 over the first frequency band. According to an embodiment, the processor 300 may identify whether there is at least one different frequency band (or frequency) other than the first frequency band supported by the AP 210 based on the operating class and channel number included in the neighbor AP information configured as shown in Table 2 of the RNR information obtained from the AP 210 over the first frequency band.

According to an embodiment, if there is a frequency band corresponding to at least one different frequency band (or frequency) other than the first frequency band supported by the AP 210 among the frequency bands of the at least one AP found through the scan, the processor 300 may determine that there is a second frequency band different from the first frequency band usable for WLAN communication with the AP 210.

According to an embodiment, if there is no frequency band corresponding to at least one different frequency band (or frequency) other than the first frequency band supported by the AP 210 among the frequency bands of the at least one AP found through the scan, the processor 300 may determine that there is no second frequency band different from the first frequency band usable for WLAN communication with the AP 210.

According to various embodiments, upon determining that there is no second frequency band different from the first frequency band usable for WLAN communication with the AP 210 (e.g., 'no' at operation 605), the electronic device (e.g., processor 120 or 300) may end the process for identifying plural frequency bands supported by the AP.

According to various embodiments, upon determining that there is a second frequency band different from the first frequency band usable for WLAN communication with the AP 210 (e.g., 'yes' at operation 605), at operation 607, the electronic device (e.g., processor 120 or 300) may compare the first frequency band and the second frequency band. For example, in some embodiments, the electronic device (or processor 300) may compare the first frequency band and the second frequency band to identify a higher frequency band among the first frequency band and the second frequency band. According to an embodiment, the processor 300 may determine whether the first frequency band is a lower frequency band than the second frequency band based on the result of comparison between the first frequency band and the second frequency band (e.g., operation 405 in FIG. 4).

According to various embodiments, upon determining that the AP 210 connected over the first frequency band supports at least one other frequency band different from the first frequency band, the electronic device 101 may perform a scan to detect at least one other frequency band based on the location of the electronic device 101. According to an embodiment, the processor 300 may check the location or the direction of movement of the electronic device 101 while being connected to the AP 210 over the first frequency band. For example, upon determining that the distance to the AP 210 detected based on the location of the electronic device 101 satisfies a specified scan condition, the processor 300 may control the communication circuit 310 to periodically perform a scan for detecting at least one other frequency band supported by the AP 210. For example, the state satisfying the specified scan condition may include a state in which the distance between the electronic device 101 and the AP 210 is shorter than a specified reference distance. For example, upon determining that the distance to the AP 210 detected based on the location of the electronic device 101 fails to satisfy the specified scan condition, the processor 300 may control the communication circuit 310 not to perform a scan for detecting at least one other frequency band supported by the AP 210. For instance, the state in which the specified scan condition is not satisfied may include a state in which the distance between the electronic device 101 and the AP 210 is greater than or equal to the specified reference distance. For example, when it is determined that the electronic device 101 is moved toward a location where the AP 210 is installed (or deployed), the processor 300 may control the communication circuit 310 to periodically perform a scan for detecting at least one other frequency band supported by the AP 210. For example, when it is determined that the electronic device 101 is moved in a direction opposite to the location where the AP 210 is installed (or deployed), the processor 300 may control the communication circuit 310 not to perform a scan for detecting at least one other frequency band supported by the AP 210.

Figure 7:
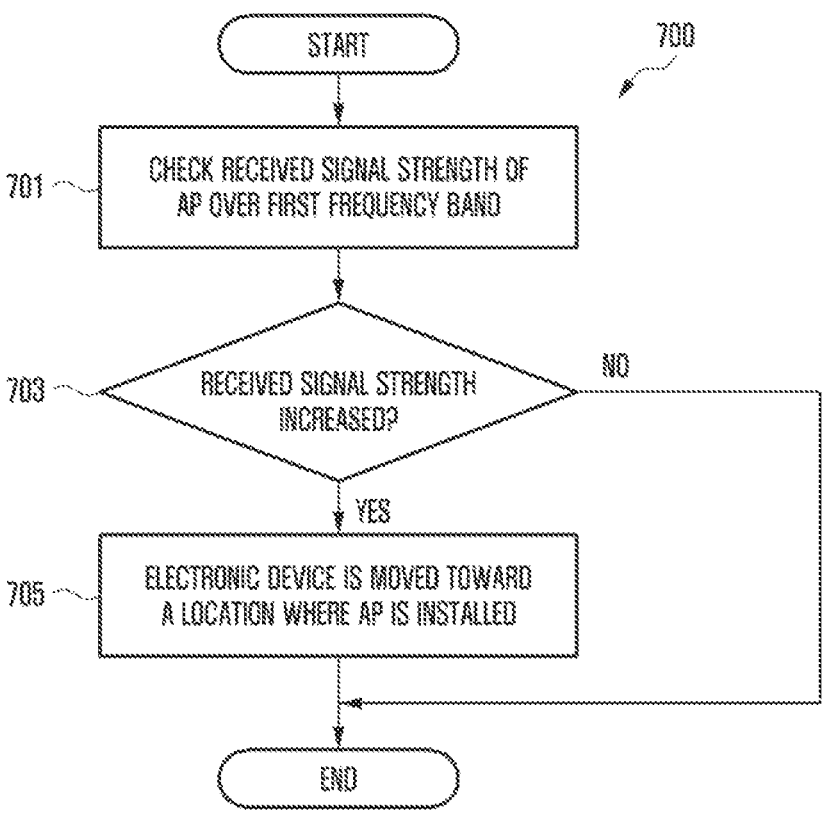
FIG. 7 is a flowchart for the electronic device to obtain movement information according to various embodiments.

FIG. 7 is a flowchart 700 for the electronic device to obtain movement information according to various embodiments. According to an embodiment, at least some of FIG. 7 may be detailed ones of operations 407 and 409 in FIG. 4. In the flowchart 700, operations may be performed in sequence but are not necessarily required to be performed in sequence. For example, the order of operations may be changed, and at least two operations may be performed in parallel. According to an embodiment, the electronic device of FIG. 7 may be the electronic device 101 of FIG. 1, 2 or 3.

According to various embodiments with reference to FIG. 7, upon determining that the first frequency band is lower than the second frequency band (e.g., 'yes' at operation 405 in FIG. 4), at operation 701, the electronic device (e.g., processor 120 or wireless communication module 192 in FIG. 1, or processor 300 or communication circuit 310 in FIG. 3) may check the received signal strength of the AP 210 over the first frequency band. For example, in some embodiments, the electronic device (or processor 300) may check the received signal strength of WLAN communication with the AP 210 over the first frequency band. According to an embodiment, the processor 300 may periodically measure the signal strength of WLAN communication with the AP 210 over the first frequency band through the communication circuit 310.

According to various embodiments, at operation 703, the electronic device (e.g., processor 120 or 300, wireless communication module 192, or communication circuit 310) may determine whether the received signal strength has increased. For example, in some embodiments, the electronic device (or processor 300) may determine whether the received signal strength of WLAN communication with the AP 210 over the first frequency band increases. According to an embodiment, when the received signal strength of WLAN communication with the AP 210 periodically measured over the first frequency band continuously increases for a specified time, the processor 300 may determine that the received signal strength of WLAN communication with the AP 210 over the first frequency band has been increased.

According to various embodiments, when the received signal strength of WLAN communication with the AP 210 over the first frequency band is not increased (e.g., 'no' at operation 703), the electronic device (e.g., processor 120 or 300, wireless communication module 192, or communication circuit 310) may end the process for obtaining movement information of the electronic device 101. According to an embodiment, when the received signal strength of WLAN communication with the AP 210 over the first frequency band is decreased or fixed, the processor 300 may determine that the electronic device 101 is not moved to a location where the AP 210 is installed (or deployed).

According to various embodiments, when the received signal strength of WLAN communication with the AP 210 over the first frequency band is increased (e.g., 'yes' at operation 703), at operation 705, the electronic device (e.g., processor 120 or 300, wireless communication module 192, or communication circuit 310) may determine that the electronic device 101 is moved toward a location where the AP 210 is installed (or deployed). For example, in some embodiments, when the received signal strength has increased, the electronic device (or processor 300) may determine that the electronic device 101 has moved closer to the AP 210.

Figure 8:
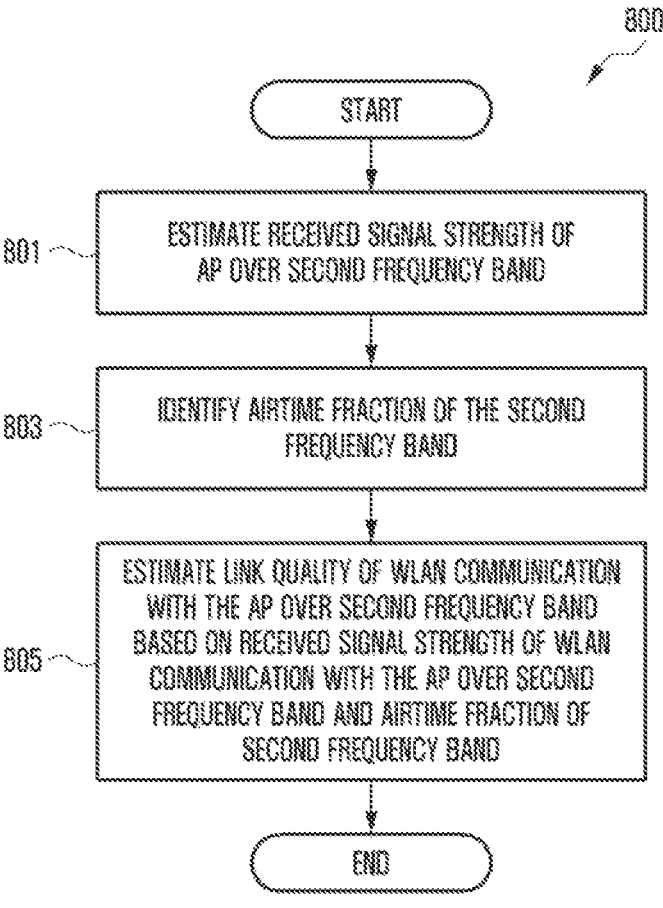
FIG. 8 is a flowchart for the electronic device to check link quality according to various embodiments.

FIG. 8 is a flowchart 800 for the electronic device to check link quality according to various embodiments. According to an embodiment, at least some of FIG. 8 may be a detailed one of operation 411 in FIG. 4. In the flowchart 800, operations may be performed in sequence but are not necessarily required to be performed in sequence. For example, the order of operations may be changed, and at least two operations may be performed in parallel. According to an embodiment, the electronic device of FIG. 8 may be the electronic device 101 of FIG. 1, 2 or 3.

According to various embodiments with reference to FIG. 8, when it is determined that the electronic device 101 is moved toward a location where the AP 210 is installed (or deployed) while being connected to the AP 210 over the first frequency band (e.g., 'yes' at operation 409 in FIG. 4), at operation 801, the electronic device (e.g., processor 120 or wireless communication module 192 in FIG. 1, or processor 300 or communication circuit 310 in FIG. 3) may estimate the received signal strength of WLAN communication with the AP 210 over the second frequency band. For example, in some embodiments, the electronic device (or processor 300) may estimate the received signal strength of WLAN communication with the AP 210 over the second frequency band based on the received signal strength of WLAN communication with the AP 210 over the first frequency band.

According to an embodiment, as shown in Equation 1, the processor 300 may estimate the received signal strength of WLAN communication with the AP 210 over the second frequency band (e.g., co-located AP's RSSI) on the basis of the received signal strength of WLAN communication with the AP 210 over the first frequency band (e.g., connected AP's RSSI) and the difference in received signal strength between the first frequency band and the second frequency band stored in the memory 320 (e.g., RSSI duff).

$$\text{Co-located AP's predicted RSSI} = \text{connected AP's RSSI} - \text{RSSI Diff} \qquad \text{[Equation 1]}$$

According to an embodiment, as shown in Equation 2, path loss may be reduced relatively much when the wavelength of a signal for WLAN communication is short than when the wavelength is large as the distance d between the location where the AP 210 is installed (or deployed) and the electronic device 101 decreases. For example, based on Equation 2, the difference in received signal strength between the first frequency band and the second frequency band may be reduced as the distance between the electronic device 101 and the location where the AP 210 is installed (or deployed) becomes shorter. Hence, the received signal strength of WLAN communication with the AP 210 over the second frequency band calculated based on Equation 1 may include a minimum value that can be calculated based on the received signal strength of WLAN communication with the AP 210 over the first frequency band.

$$L = 20\log_{10}\left(\frac{4\pi d}{\lambda}\right) \qquad \text{[Equation 2]}$$

For example, L may indicate path loss, d may indicate the distance between the electronic device 101 and the AP 210, and $\lambda$ may indicate the wavelength.

According to various embodiments, at operation 803, the electronic device (e.g., processor 120 or 300, wireless communication module 192, or communication circuit 310) may identify the airtime fraction of the second frequency band. For example, in some embodiments, the electronic device (or processor 300) may identify the airtime fraction of the AP 210 over the second frequency band. According to an embodiment, the processor 300 may identify the airtime fraction of the second frequency band based on the downlink airtime fraction and/or uplink airtime fraction obtained from the AP 210 over the second frequency band. For example, the airtime fraction of the second frequency band may include the downlink airtime fraction or the uplink airtime fraction. For example, the airtime fraction of the second frequency band may include a relatively short one of the downlink airtime fraction and the uplink airtime fraction. For example, the air time fraction of the second frequency band may include a relatively long one of the downlink airtime fraction and the uplink airtime fraction. For example, the airtime fraction of the second frequency band may include the average of the downlink airtime fraction and the uplink airtime fraction. For instance, the downlink airtime fraction may be included in 'estimated outbound air time fraction' of 'outbound air time list' in 'estimated service parameters outbound element' configured as shown in Table 5 (e.g., IEEE 802.11 standard).

TABLE 5

| | Element ID | Length | Element ID Extension | Outbound Air Time Bitmap | Outbound Air Time List |
|---|---|---|---|---|---|
| Octets: | 1 | 1 | 1 | 1 | 0, 1, 2, 3, or 4 |

For example, the uplink airtime fraction may be included in 'estimated inbound air time fraction' of 'ESP information field' in 'estimated service parameters inbound element' configured as shown in Table 6 (e.g., IEEE 802.11 standard).

TABLE 6

| | B0-B1 Access Category | B2 Reserved | B3-B4 Data Format | B5-B7 BA Window Size | B8-B15 Estimated Inbound Air Time Fraction | B16-B23 Data PPDU Duration Target |
|---|---|---|---|---|---|---|
| Bits: | 2 | 1 | 2 | 3 | 8 | 8 |

According to an embodiment, the processor 300 may estimate the airtime fraction of the second frequency band based on a channel utilization (CU) value as shown in Equation 3.

$$\text{AirTimeFraction}=255-\text{CU} \qquad \text{[Equation 3]}$$

As an example, the CU value may be identified in 'BSS load element' configured as shown in Table 7 (e.g., IEEE 802.11 standard) obtained from the AP 210 over the second frequency band.

TABLE 7

| | Element ID | Length | Station Count | Channel Utilization | Available Admission Capacity |
|---|---|---|---|---|---|
| Octets: | 1 | 1 | 2 | 1 | 2 |

According to various embodiments, at operation 805, the electronic device (e.g., processor 120 or 300, wireless communication module 192, or communication circuit 310) may estimate the link quality of WLAN communication with the AP 210 over the second frequency band based on the received signal strength of WLAN communication with the AP 210 over the second frequency band and the airtime fraction of the second frequency band. According to an embodiment, the processor 300 may calculate the link quality of WLAN communication with the AP 210 over the second frequency band as shown in Equation 4 on the basis of the received signal strength of WLAN communication with the AP 210 over the second frequency band and the airtime fraction of the second frequency band.

$$\text{[Equation 4]}$$

$$ETP(RSSI, \text{Airtime fraction}) = \frac{\text{Airtime fraction}}{255} \times \text{Data rate}$$

For example, ETP (RSSI, airtime fraction) indicates the link quality for WLAN communication with the AP 210 over the second frequency band, and air time fraction may indicate the air time fraction of the second frequency band. For example, data rate may indicate the data rate for WLAN communication with the AP 210 over the second frequency band, and may be calculated as in Equation 5.

$$\text{[Equation 5]}$$

$$DataRate = \min(\log_2(1 + SNR_{tone}), MaxBitsPerSc) \times \frac{NSS\_max \times Ntone}{DSYM_{DUR}}$$

For example, MaxBitsPerSc may indicate a value related to the modulation order for WLAN communication with the AP 210 over the second frequency band, $DSYM_{DUR}$ may indicate the processing time of PPDU (physical protocol data unit) symbols, NSS_max may indicate the maximum number of specific streams, and $SNR_{tone}$ is a value related to the received signal strength (e.g., RSSI) for WLAN communication with the AP 210 over the second frequency band and may be calculated as in Equation 6.

$$SNR_{tone} = 10^{\frac{RSSI+P_{adjust}}{10}} \qquad \text{[Equation 6]}$$

Figure 9:
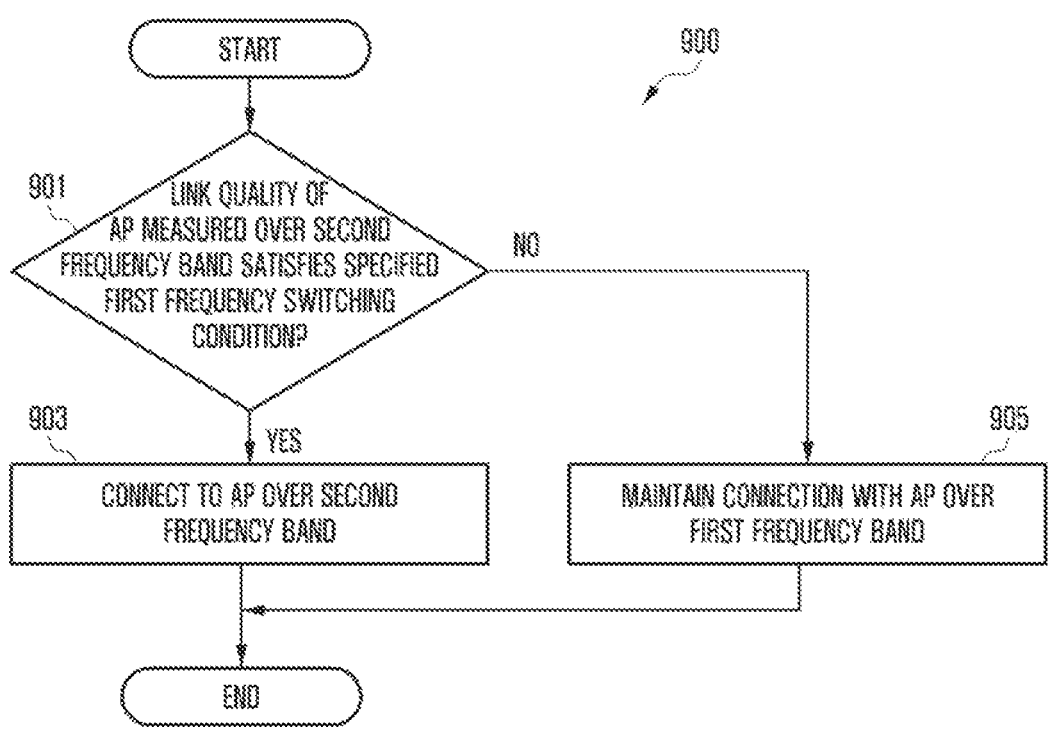
FIG. 9 is a flowchart for the electronic device to switch the frequency band for WLAN communication according to various embodiments.

FIG. 9 is a flowchart 900 for the electronic device to switch the frequency band for WLAN communication according to various embodiments. According to an embodiment, at least some of FIG. 9 may be a detailed one of operation 413 in FIG. 4. In the flowchart 900, operations may be performed in sequence but are not necessarily required to be performed in sequence. For example, the order of operations may be changed, and at least two operations may be performed in parallel. According to an embodiment, the electronic device of FIG. 9 may be the electronic device 101 of FIG. 1, 2 or 3.

According to various embodiments with reference to FIG. 9, after the link quality for WLAN communication with the AP 210 over the second frequency band is estimated (e.g., operation 411 in FIG. 4), at operation 901, the electronic device (e.g., processor 120 or wireless communication module 192 in FIG. 1, or processor 300 or communication circuit 310 in FIG. 3) may check whether the link quality for WLAN communication with the AP 210 measured over the second frequency band satisfies a specified first frequency switching condition. For example, the state that satisfies the specified first frequency switching condition may include a state in which the ratio of the link quality for WLAN communication with the AP 210 over the first frequency band to the estimated link quality for WLAN communication with the AP 210 over the second frequency band exceeds a specified first reference link quality. For example, the state that satisfies the specified first frequency switching condition may include a state in which the estimated link quality for WLAN communication with the AP 210 over the second frequency band is better than the link quality for WLAN communication with the AP 210 over the first frequency band. For example, the state that does not satisfy the specified first frequency switching condition may include a state in which the ratio of the link quality for WLAN communication with the AP 210 over the first frequency band to the estimated link quality for WLAN communication with the AP 210 over the second frequency band is less than or equal to the specified first reference link quality. For example, the state that does not satisfy the specified first frequency switching condition may include a state in which the estimated link quality for WLAN communication with the AP 210 over the second frequency band is worse than the link quality for WLAN communication with the AP 210 over the first frequency band.

According to various embodiments, upon determining that the link quality for WLAN communication with the AP 210 over the second frequency band satisfies the specified first frequency switching condition (e.g., 'yes' at operation 901), at operation 903, the electronic device (e.g., processor 120 or 300, wireless communication module 192, or communication circuit 310) may connect to the AP 210 over the second frequency band. According to an embodiment, the processor 300 may control the communication circuit 310 to switch the frequency band for WLAN communication with the AP 210 from the first frequency band to the second frequency band. For example, the processor 300 may control the communication circuit 310 to switch the frequency band for WLAN communication with the AP 210 to the second frequency band based on at least one of RSN, HE, HT, or VHT stored in the memory 320.

According to various embodiments, upon determining that the link quality for WLAN communication with the AP 210 over the second frequency band fails to satisfy the specified first frequency switching condition (e.g., 'no' at operation 901), at operation 905, the electronic device (e.g., processor 120 or 300, wireless communication module 192, or communication circuit 310) may maintain the connection of WLAN communication with the AP 210 over the first frequency band.

Figure 10:
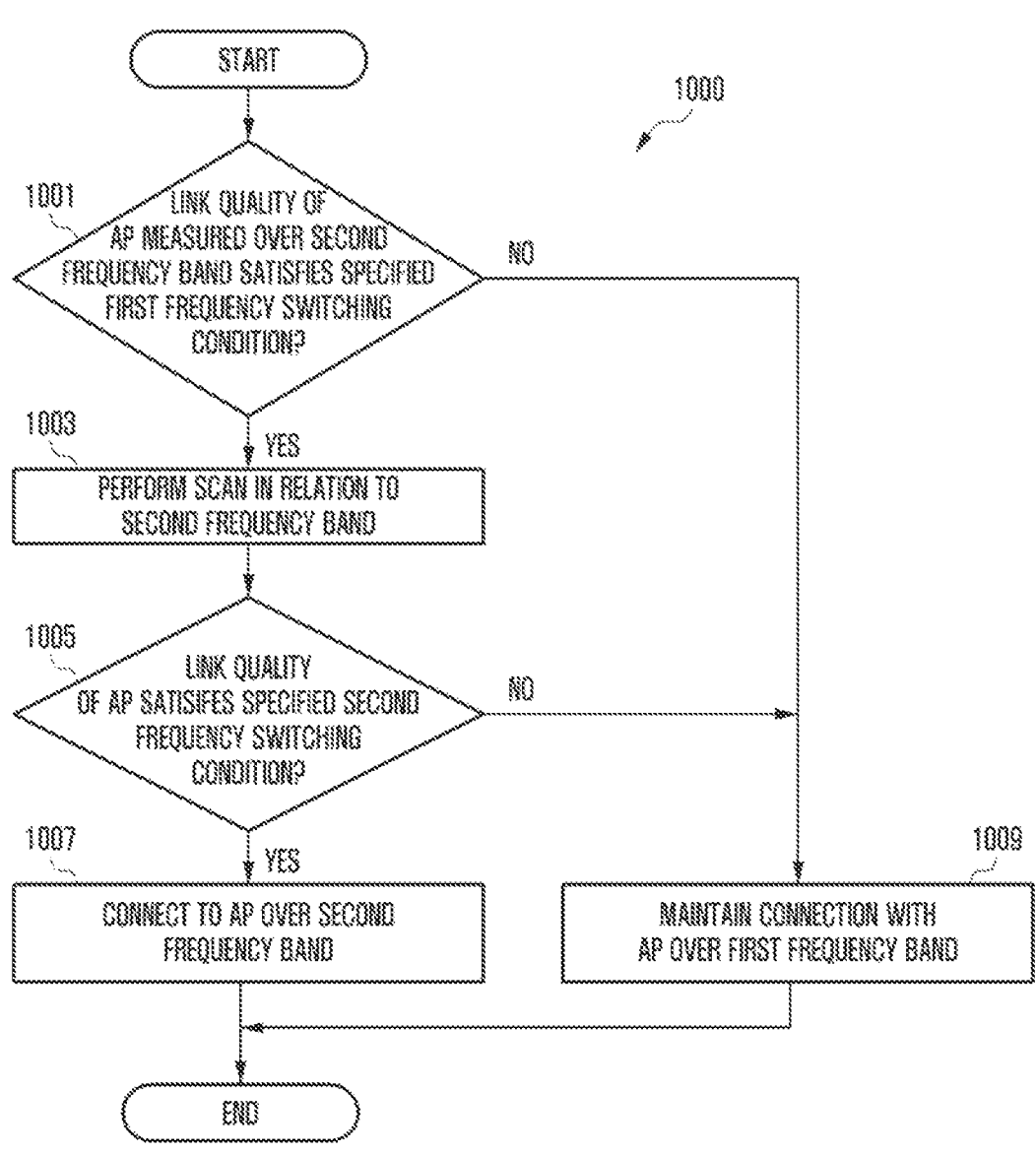
FIG. 10 is a flowchart for the electronic device to determine whether to switch the frequency band for WLAN communication according to various embodiments.

FIG. 10 is a flowchart 1000 for the electronic device to determine whether to switch the frequency band for WLAN communication according to various embodiments of the disclosure. According to an embodiment, at least some of FIG. 10 may be a detailed one of operation 413 in FIG. 4. In the flowchart 1000, operations may be performed in sequence but are not necessarily required to be performed in sequence. For example, the order of operations may be changed, and at least two operations may be performed in parallel. According to an embodiment, the electronic device of FIG. 10 may be the electronic device 101 of FIG. 1, 2 or 3.

According to various embodiments with reference to FIG. 10, after the link quality for WLAN communication with the AP 210 over the second frequency band is estimated (e.g., operation 411 in FIG. 4), at operation 1001, the electronic device (e.g., processor 120 or wireless communication module 192 in FIG. 1, or processor 300 or communication circuit 310 in FIG. 3) may check whether the link quality for WLAN communication with the AP 210 measured over the second frequency band satisfies a specified first frequency switching condition. For example, the state that satisfies the specified first frequency switching condition may include a state in which the ratio of the link quality for WLAN communication with the AP 210 over the first frequency band to the estimated link quality for WLAN communication with the AP 210 over the second frequency band exceeds a specified first reference link quality. For example, the state that satisfies the specified first frequency switching condition may include a state in which the estimated link quality for WLAN communication with the AP 210 over the second frequency band is better than the link quality for WLAN communication with the AP 210 over the first frequency band. For example, the state that does not satisfy the specified first frequency switching condition may include a state in which the ratio of the link quality for WLAN communication with the AP 210 over the first frequency band to the estimated link quality for WLAN communication with the AP 210 over the second frequency band is less than or equal to the specified first reference link quality. For example, the state that does not satisfy the specified first frequency switching condition may include a state in which the estimated link quality for WLAN communication with the AP 210 over the second frequency band is worse than the link quality for WLAN communication with the AP 210 over the first frequency band.

According to various embodiments, upon determining that the link quality for WLAN communication with the AP 210 over the second frequency band satisfies the specified first frequency switching condition (e.g., 'yes' at operation 1001), at operation 1003, the electronic device (e.g., processor 120 or 300, wireless communication module 192, or communication circuit 310) may perform a scan related to the second frequency band.

According to various embodiments, at operation 1005, the electronic device (e.g., processor 120 or 300, wireless communication module 192, or communication circuit 310) may check whether the link quality for WLAN communication with the AP 210 over the second frequency band obtained through the scan satisfies a specified second frequency switching condition. For example, the state that satisfies the specified second frequency switching condition may include a state in which the ratio of the link quality for WLAN communication with the AP 210 over the first frequency band to the link quality for WLAN communication with the AP 210 over the second frequency band obtained through the scan exceeds a specified second reference link quality. For example, the state that satisfies the specified second frequency switching condition may include a state in which the link quality for WLAN communication with the AP 210 over the second frequency band obtained through the scan is better than the link quality for WLAN communication with the AP 210 over the first frequency band. For example, the state that does not satisfy the specified second frequency switching condition may include a state in which the ratio of the link quality for WLAN communication with the AP 210 over the first frequency band to the link quality for WLAN communication with the AP 210 over the second frequency band obtained through the scan is less than or equal to the specified second reference link quality. For example, the state that does not satisfy the specified second frequency switching condition may include a state in which the link quality for WLAN communication with the AP 210 over the second frequency band obtained through the scan is worse than the link quality for WLAN communication with the AP 210 over the first frequency band. For example, the specified second reference link quality may be the same as or different from the specified first reference link quality.

According to various embodiments, upon determining that the link quality for WLAN communication with the AP 210 over the second frequency band obtained through the scan satisfies the specified second frequency switching condition (e.g., 'yes' at operation 1005), at operation 1007, the electronic device (e.g., processor 120 or 300, wireless communication module 192, or communication circuit 310) may connect to the AP 210 over the second frequency band. According to an embodiment, the processor 300 may control the communication circuit 310 to switch the frequency band for WLAN communication with the AP 210 from the first frequency band to the second frequency band.

According to various embodiments, upon determining that the link quality for WLAN communication with the AP 210 over the second frequency band fails to satisfy the specified first frequency switching condition (e.g., 'no' at operation 1001), or upon determining that the link quality for WLAN communication with the AP 210 over the second frequency band obtained through the scan fails to satisfy the specified second frequency switching condition (e.g., 'no' at operation 1005), at operation 1009, the electronic device (e.g., processor 120 or 300, wireless communication module 192, or communication circuit 310) may maintain the connection of WLAN communication with the AP 210 over the first frequency band.

According to various embodiments, an operation method of the electronic device (e.g., electronic device 101 in FIG. 1, FIG. 2 and/or FIG. 3) may include: performing WLAN communication with an access point (AP) over a first frequency band among plural frequency bands supported by the electronic device for WLAN communication; comparing, when a signal of a second frequency band supported by the AP and different from the first frequency band is detected through a scan, the first frequency band with the second frequency band; identifying, if the second frequency band is higher than the first frequency band, a change in strength of a signal received over the first frequency band from the AP; estimating the link quality for the AP over the second frequency band based on the strength of the signal received over the first frequency band from the AP when the strength of the signal received over the first frequency band from the AP increases; and switching the frequency band for WLAN communication with the AP to the second frequency band based on the link quality for the AP over the second frequency band.

According to various embodiments, the operation method may further include identifying whether the AP supports at least one different frequency band other than the first frequency band based on reduced neighbor report (RNR) information obtained from the AP over the first frequency band.

According to various embodiments, the RNR information may be included in a beacon signal, a file discovery signal, or a probe response signal.

According to various embodiments, upon determining that the AP supports at least one different frequency band other than the first frequency band, the operation method may further include: identifying the at least one different frequency band based on the RNR information obtained over the first frequency band from the AP; and searching for the at least one different frequency band through the scan.

According to various embodiments, if the second frequency band is higher than the first frequency band, the operation method may further include storing, in a memory of the electronic device, information about at least one of a difference between the strength of a signal received from the AP over the first frequency band obtained through the scan and the strength of a signal received from the AP over the second frequency band, the airtime fraction of the second frequency band, or the strength of a signal received from the AP over the first frequency band.

According to various embodiments, storing the information in a memory may include further storing, in the memory, information about at least one of robust security network (RSN), high efficiency (HE), high throughput (HT), or very high throughput (VHT) obtained through the scan in relation to the second frequency band.

According to various embodiments, estimating the link quality for the AP over the second frequency band may include: estimating the strength of a signal received from the AP over the second frequency band based on the strength of a signal received from the AP over the first frequency band and the difference, stored in the memory, between the strength of a signal received from the AP over the first frequency band and the strength of a signal received from the AP over the second frequency band; and estimating the link quality of the AP over the second frequency band based on the estimated strength of a signal received from the AP over the second frequency band and the airtime fraction of the second frequency band.

According to various embodiments, estimating the link quality for the AP over the second frequency band may include: determining that the electronic device is moved in a direction in which the AP is located when the strength of a signal received from the AP through the first frequency band increases; and estimating, in case of determining that the electronic device is moved in a direction in which the AP is located, the link quality for the AP over the second frequency band based on the strength of a signal received from the AP over the first frequency band.

According to various embodiments, switching the frequency band for WLAN communication with the AP to the second frequency band may include switching the frequency band for WLAN communication with the AP to the second frequency band when the link quality for the AP over the second frequency band satisfies a specified frequency switching condition.

According to various embodiments, switching the frequency band for WLAN communication with the AP to the second frequency band may include: performing a scan related to the second frequency band when the link quality for the AP over the second frequency band satisfies the specified frequency switching condition; and switching the frequency band for WLAN communication with the AP to the second frequency band based on the scan result related to the second frequency band.

The embodiments of the disclosure disclosed in this specification and drawings are provided as specific examples to easily explain the technical contents of the embodiments of the disclosure and help the understanding thereof, and are not intended to limit the scope of the embodiments of the disclosure. Accordingly, the scope of various embodiments of the disclosure should be construed to include both the embodiments disclosed herein and all changes or modifications derived from the technical ideas of those embodiments.

What is claimed is:

1. An electronic device comprising:

memory storing instructions;

communication circuitry configured to support a plurality of frequency bands for wireless local area network (WLAN) communication; and a processor operably connected to the memory and the communication circuitry, wherein the instructions, when executed by the processor, cause the electronic device to:

establish, via the communication circuitry, WLAN communication with an access point (AP) over a first frequency band among the plurality of frequency bands;

determine, based on detecting a signal of a second frequency band supported by the AP through a scan, whether the second frequency band is higher than the first frequency band;

based on determining that the second frequency band is higher than the first frequency band, identify whether a strength of a signal received over the first frequency band from the AP changes;

estimate, when the strength of the signal received over the first frequency band increases, a link quality for the AP over the second frequency band based on the strength of the signal received over the first frequency band from the AP; and switch the first frequency band for WLAN communication with the AP to the second frequency band based on the link quality.

2. The electronic device of claim 1, wherein the instructions, when executed by the processor, cause the electronic device to determine whether the AP supports at least one different frequency band other than the first frequency band based on reduced neighbor report (RNR) information obtained over the first frequency band from the AP.

3. The electronic device of claim 2, wherein the RNR information is included in a beacon signal, a file discovery signal, or a probe response signal.

4. The electronic device of claim 2, wherein when the AP supports the at least one different frequency band, the instructions, when executed by the processor, cause the electronic device to identify the at least one different frequency band based on the RNR information, and search for the at least one different frequency band through a scan.

5. The electronic device of claim 1, wherein when the second frequency band is higher than the first frequency band, the instructions, when executed by the processor, cause the electronic device to store, in the memory, information about at least one of a difference between the strength of the signal received from the AP over the first frequency band obtained through a scan and a strength of the signal received from the AP over the second frequency band, an airtime fraction of the second frequency band, or the strength of the signal received from the AP over the first frequency band.

6. The electronic device of claim 5, wherein when the second frequency band is higher than the first frequency band, the instructions, when executed by the processor, cause the electronic device to further store, in the memory, information about at least one of robust security network (RSN), high efficiency (HE), high throughput (HT), or very high throughput (VHT) obtained through the scan in relation to the second frequency band.

7. The electronic device of claim 5,
   wherein the instructions, when executed by the processor, cause the electronic device to:
   estimate the strength of the signal received from the AP over the second frequency band, based on the strength of the signal received from the AP over the first frequency band and the difference, stored in the memory, between the strength of the signal received from the AP over the first frequency band and the strength of the signal received from the AP over the second frequency band; and
   estimate the link quality of the AP over the second frequency band based on the strength that is estimated and the airtime fraction of the second frequency band.

8. The electronic device of claim 1, wherein the instructions, when executed by the processor, cause the electronic device to:
   determine that the electronic device is moved in a direction in which the AP is located when the strength of the signal received from the AP over the first frequency band increases; and
   estimate, when the electronic device is moved in the direction in which the AP is located, the link quality for the AP over the second frequency band based on the strength of the signal received from the AP over the first frequency band.

9. The electronic device of claim 1, wherein when the link quality satisfies a frequency switching condition, the instructions, when executed by the processor, cause the electronic device to switch the first frequency band to the second frequency band.

10. The electronic device of claim 1, wherein the instructions, when executed by the processor, cause the electronic device to:
   perform a scan related to the second frequency band when the link quality satisfies a frequency switching condition; and
   switch the first frequency band to the second frequency band based on a scan result of the scan.

11. An operation method of an electronic device, the method comprising:
   performing wireless local area network (WLAN) communication with an access point (AP) over a first frequency band among a plurality of frequency bands supported by the electronic device for WLAN communication;
   determining, based on detecting a signal of a second frequency band supported by the AP through a scan, whether the second frequency band is higher than the first frequency band;
   based on determining that the second frequency band is higher than the first frequency band, identifying whether a strength of a signal received over the first frequency band from the AP changes;
   estimating, when the strength of the signal received over the first frequency band increases, a link quality for the AP over the second frequency band based on the strength of the signal received over the first frequency band from the AP; and
   switching the first frequency band for WLAN communication with the AP to the second frequency band based on the link quality.

12. The operation method of claim 11, further comprising determining whether the AP supports at least one different frequency band other than the first frequency band based on reduced neighbor report (RNR) information obtained from the AP over the first frequency band.

13. The operation method of claim 12, wherein the RNR information is included in a beacon signal, a file discovery signal, or a probe response signal.

14. The operation method of claim 12, further comprising based on the AP supporting the at least one different frequency band:
   identifying the at least one different frequency band based on the RNR information; and
   searching for the at least one different frequency band through a scan.

15. The operation method of claim 11, further comprising, when the second frequency based is higher than the first frequency band, storing, in a memory of the electronic device, information about at least one of a difference between the strength of the signal received from the AP over the first frequency band and a strength of the signal received from the AP over the second frequency band, an airtime fraction of the second frequency band, or the strength of the signal received from the AP over the first frequency band.

16. The operation method of claim 15, wherein storing information in the memory comprises further storing, in the memory, information about at least one of robust security network (RSN), high efficiency (HE), high throughput (HT), or very high throughput (VHT) obtained through a scan in relation to the second frequency band.

17. The operation method of claim 15, wherein the estimating comprises:

estimating the strength of the signal received from the AP over the second frequency band based on the strength of the signal received from the AP over the first frequency band and the difference, stored in the memory, between the strength of the signal received from the AP over the first frequency band and the strength of the signal received from the AP over the second frequency band; and estimating the link quality for the AP over the second frequency band based on the strength that is estimated and the airtime fraction of the second frequency band.

18. The operation method of claim 11, wherein the estimating comprises:

determining that the electronic device is moved in a direction in which the AP is located when the strength of the signal received from the AP through the first frequency band increases; and estimating, when the electronic device is moved in the direction in which the AP is located, the link quality for the AP over the second frequency band based on the strength of the signal received from the AP over the first frequency band.

19. The operation method of claim 11, wherein the first frequency band for WLAN communication with the AP is switched to the second frequency band when the link quality satisfies a frequency switching condition.

20. The operation method of claim 11, wherein the switching comprises:

performing a scan related to the second frequency band when the link quality satisfies a frequency switching condition; and switching the first frequency band to the second frequency band based on a scan result of the scan.

\* \* \* \* \*